US005708780A

United States Patent [19]
Levergood et al.

[11] Patent Number: 5,708,780
[45] Date of Patent: Jan. 13, 1998

[54] INTERNET SERVER ACCESS CONTROL AND MONITORING SYSTEMS

[75] Inventors: Thomas Mark Levergood, Hopkinton; Lawrence C. Stewart, Burlington; Stephen Jeffrey Morris, Westford; Andrew C. Payne, Lincoln; George Winfield Treese, Newton, all of Mass.

[73] Assignee: Open Market, Inc., Cambridge, Mass.

[21] Appl. No.: 474,096

[22] Filed: Jun. 7, 1995

[51] Int. Cl.$^6$ .................................................. G06F 15/56
[52] U.S. Cl. ............................. 395/200.12; 395/200.15
[58] Field of Search .......................... 395/200.11, 200.12, 395/200.02, 200.05, 200.06, 200.09, 200.15; 380/23, 24, 25, 49; 340/825.34

[56] References Cited

U.S. PATENT DOCUMENTS

| | | | |
|---|---|---|---|
| 5,347,632 | 9/1994 | Filepp et al. | 395/200 |
| 5,544,322 | 8/1996 | Cheng et al. | 395/200.12 |
| 5,560,008 | 9/1996 | Johnson et al. | 395/200.09 |
| 5,577,209 | 11/1996 | Boyle et al. | 395/200.06 |

FOREIGN PATENT DOCUMENTS

| | | | |
|---|---|---|---|
| 0 456 920 | 11/1991 | European Pat. Off. | |
| 0 645 688 | 3/1995 | European Pat. Off. | |
| WO 94/03859 | 2/1994 | WIPO | G06F 13/14 |
| WO 94/03959 | 2/1994 | WIPO | |

OTHER PUBLICATIONS

Bina et al., Secure Access to Data over the Internet, 1994, pp. 99–102, IEEE.

Kiuchi et al., C-HTTP—the Development of a Secure, Closed HTTP based Network on the Internet, 1996, pp. 64–75, IEEE.

Ramanathan, Srinivas, et al., "Architectures for Personalized Multimedia," IEEE Multimedia, vol. 1, No. 1, Computer Society, pp. 37–46, 1994.

Choudhury, Abhijit K., et al., "Copyright Protection for Electronic Publishing Over Computer Networks," IEEE Network, The Magazine of Computer Communications, vol. 9, No. 3, pp. 12–20, May 1995.

Netscape Products, "Open and Secure Internet Software" Internet Sep. 18, 1995, pp. 1–2.

Merchant System: Overview, "Netscape Merchant System Data Sheet" Internet, Sep. 18, 1995, pp. 1–3.

Internet Applications Customer Showcase, "Customer Showcase" Internet, Sep. 18, 1995., pp. 1–2.

The Server–Application Function and Netscape Server API, "The Netscape Server API" Netscape Products Internet, Sep. 18, 1995, pp. 1–11.

The Object–Oriented Paradigm of Server Configuration, "The Object–Oriented Paradigm of Server Configuration" Internet, Sep. 18, 1995, p. 102.

Verisign Redirection Information, "Important Announcement" Internet, Sep. 18, 1995, p. 1.

(List continued on next page.)

*Primary Examiner*—William M. Treat
*Assistant Examiner*—Patrice L. Winder
*Attorney, Agent, or Firm*—Hamilton, Brook, Smith & Reynolds, P.C.

[57] ABSTRACT

This invention relates to methods for controlling and monitoring access to network servers. In particular, the process described in the invention includes client-server sessions over the Internet involving hypertext files. In the hypertext environment, a client views a document transmitted by a content server with a standard program known as the browser. Each hypertext document or page contains links to other hypertext pages which the user may select to traverse. When the user selects a link that is directed to an access-controlled file, the server subjects the request to a secondary server which determines whether the client has an authorization or valid account. Upon such verification, the user is provided with a session identification which allows the user to access to the requested file as well as any other files within the present protection domain.

45 Claims, 7 Drawing Sheets

OTHER PUBLICATIONS

Lou Montulli, Electronic Mail to multiple recipients of the www–talk list (www–talk@www10.w3.org) on "Session Tracking" (omi.mail.www–talk, Apr. 18, 1995).

PR: Digital IDs for Open Market's Secure WebServer, "Press Release, VeriSign, Inc. to Provide Digital IDs for Open Market's Secure WebServer" Internet, Sep. 18, 1995, pp. 1–2.

PR: Online Security Solutions, "Verisign, Inc. Adds the Missing Component to Online Security Solutions" Internet, Sep. 18, 1995, pp. 1–2.

The SSL Protocol, Internet, Sep. 18, 1995, pp. 1–18.

IStore, "Netscape Istore Data Sheet" Internet, Sep. 18, 1995, pp. 1–2.

| Document View |
| --- |
| *File* *Options* *Navigate* *Annotate* *Documents*    *Help* |

Title: How to join

URL: http://auth.com/service/nph-createacct.cgi

1. First name  [                ]

2. Last name  [                ]

3. Choose a screen name (no more than 15 characters)
[                ]

4. Choose a password (no more than 15 characters)

Password:
   [                ]

Re-enter password:
   [                ]

5. E-mail address
[                                          ]

6. Your birthdate (MM/DD/YY  [          ]

7. U.S. zip code, or country code

Zip/postal code:
   [                ]

ISO country code
   [US              ]

FIG. 5

INTERNET SERVER ACCESS CONTROL AND MONITORING SYSTEMS

REFERENCE TO APPENDIX

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

BACKGROUND OF THE INVENTION

The Internet, which started in the late 1960s, is a vast computer network consisting of many smaller networks that span the entire globe. The Internet has grown exponentially, and millions of users ranging from individuals to corporations now use permanent and dial-up connections to use the Internet on a daily basis worldwide. The computers or networks of computers connected within the Internet, known as "hosts", allow public access to databases featuring information in nearly every field of expertise and are supported by entities ranging from universities and government to many commercial organizations.

The information on the Internet is made available to the public through "servers". A server is a system running on an Internet host for making available files or documents contained within that host. Such files are typically stored on magnetic storage devices, such as tape drives or fixed disks, local to the host. An Internet server may distribute information to any computer that requests the files on a host. The computer making such a request is known as the "client", which may be an Internet-connected workstation, bulletin board system or home personal computer (PC).

TCP/IP (Transmission Control Protocol/Internet Protocol) is one networking protocol that permits full use of the Internet. All computers on a TCP/IP network need unique ID codes. Therefore, each computer or host on the Internet is identified by a unique number code, known as the IP (Internet Protocol) number or address, and corresponding network and computer names. In the past, an Internet user gained access to its resources only by identifying the host computer and a path through directories within the host's storage to locate a requested file. Although various navigating tools have helped users to search resources on the Internet without knowing specific host addresses, these tools still require a substantial technical knowledge of the Internet.

The World-Wide Web (Web) is a method of accessing information on the Internet which allows a user to navigate the Internet resources intuitively, without IP addresses or other technical knowledge. The Web dispenses with command-line utilities which typically require a user to transmit sets of commands to communicate with an Internet server. Instead, the Web is made up of hundreds of thousands of interconnected "pages", or documents, which can be displayed on a computer monitor. The Web pages are provided by hosts running special servers. Software which runs these Web servers is relatively simple and is available on a wide range of computer platforms including PC's. Equally available is a form of client software, known as a Web "browser", which is used to display Web pages as well as traditional non-Web files on the client system. Today, the Internet hosts which provide Web servers are increasing at a rate of more than 300 per month, en route to becoming the preferred method of Internet communication.

Created in 1991, the Web is based on the concept of "hypertext" and a transfer method known as "HTTP" (Hypertext Transfer Protocol). HTTP is designed to run primarily over TCP/IP and uses the standard Internet setup, where a server issues the data and a client displays or processes it. One format for information transfer is to create documents using Hypertext Markup Language (HTML). HTML pages are made up of standard text as well as formatting codes which indicate how the page should be displayed. The Web client, a browser, reads these codes in order to display the page. The hypertext conventions and related functions of the world wide web are described in the appendices of U.S. patent application Ser. No. 08/328,133, filed on Oct. 24, 1994, by Payne et al. which is incorporated herein by reference.

Each Web page may contain pictures and sounds in addition to text. Hidden behind certain text, pictures or sounds are connections, known as "hypertext links" ("links"), to other pages within the same server or even on other computers within the Internet. For example, links may be visually displayed as words or phrases that may be underlined or displayed in a second color. Each link is directed to a web page by using a special name called a URL (Uniform Resource Locator). URLs enable a Web browser to go directly to any file held on any Web server. A user may also specify a known URL by writing it directly into the command line on a Web page to jump to another Web page.

The URL naming system consists of three parts: the transfer format, the host name of the machine that holds the file, and the path to the file. An example of a URL may be:

http://www.college.univ.edu/Adir/Bdir/Cdir/page.html, where "http" represents the transfer protocol; a colon and two forward slashes (://) are used to separate the transfer format from the host name; "www.college.univ.edu" is the host name in which "www" denotes that the file being requested is a Web page; "/Adir/Bdir/Cdir" is a set of directory names in a tree structure, or a path, on the host machine; and "page.html" is the file name with an indication that the file is written in HTML.

The Internet maintains an open structure in which exchanges of information are made cost-free without restriction. The free access format inherent to the Internet, however, presents difficulties for those information providers requiring control over their Internet servers. Consider for example, a research organization that may want to make certain technical information available on its Internet server to a large group of colleagues around the globe, but the information must be kept confidential. Without means for identifying each client, the organization would not be able to provide information on the network on a confidential or preferential basis. In another situation, a company may want to provide highly specific service tips over its Internet server only to customers having service contracts or accounts.

Access control by an Internet server is difficult for at least two reasons. First, when a client sends a request for a file on a remote Internet server, that message is routed or relayed by a web of computers connected through the Internet until it reaches its destination host. The client does not necessarily know how its message reaches the server. At the same time, the server makes responses without ever knowing exactly who the client is or what its IP address is. While the server may be programmed to trace its clients, the task of tracing is often difficult, if not impossible. Secondly, to prevent unwanted intrusion into private local area networks (LAN), system administrators implement various data-flow control mechanisms, such as the Internet "firewalls", within their networks. An Internet firewall allows a user to reach the Internet anonymously while preventing intruders of the outside world from accessing the user's LAN.

SUMMARY OF THE INVENTION

The present invention relates to methods of processing service requests from a client to a server through a network. In particular the present invention is applicable to processing client requests in an HTTP (Hypertext Transfer Protocol) environment, such as the World-Wide Web (Web). One aspect of the invention involves forwarding a service request from the client to the server and appending a session identification (SID) to the request and to subsequent service requests from the client to the server within a session of requests. In a preferred embodiment, the present method involves returning the SID from the server to the client upon an initial service request made by the client. A valid SID may include an authorization identifier to allow a user to access controlled files.

In a preferred embodiment, a client request is made with a Uniform Resource Locator (URL) from a Web browser. Where a client request is directed to a controlled file without an SID, the Internet server subjects the client to an authorization routine prior to issuing the SID, the SID being protected from forgery. A content server initiates the authorization routine by redirecting the client's request to an authentication server which may be at a different host. Upon receiving a redirected request, the authentication server returns a response to interrogate the client and then issues an SID to a qualified client. For a new client, the authentication server may open a new account and issue an SID thereafter. A valid SID typically comprises a user identifier, an accessible domain, a key identifier, an expiration time such as date, the IP address of the user computer, and an unforgettable digital signature such as a cryptographic hash of all of the other items in the SID encrypted with a secret key. The authentication server then forwards a new request consisting of the original URL appended by the SID to the client in a REDIRECT. The modified request formed by a new URL is automatically forwarded by the client browser to the content server.

When the content server receives a URL request accompanied by an SID, it logs the URL with the SID and the user IP address in a transaction log and proceeds to validate the SID. When the SID is so validated, the content server sends the requested document for display by the client's Web browser.

In the preferred embodiment, a valid SID allows the client to access all controlled files within a protection domain without requiring further authorization. A protection domain is defined by the service provider and is a collection of controlled files of common protection within one or more servers.

When a client accesses a controlled Web page with a valid SID, the user viewing the page may want to traverse a link to view another Web page. There are several possibilities. The user may traverse a link to another page in the same path. This is called a "relative link". A relative link may be made either within the same domain or to a different domain. The browser on the client computer executes a relative link by rewriting the current URL to replace the old controlled page name with a new one. The new URL retains all portions of the old, including the SID, except for the new page name. If the relative link points to a page in the same protection domain, the SID remains valid, and the request is honored.

However, if the relative link points to a controlled page in a different protection domain, the SID is no longer valid, and the client is automatically redirected to forward the rewritten URL to the authentication server to update the SID. The updated or new SID provides access to the new domain if the user is qualified.

The user may also elect to traverse a link to a document in a different path. This is called an "absolute link". In generating a new absolute link, the SID is overwritten by the browser. In the preferred embodiment, the content server, in each serving of a controlled Web page within the domain, filters the page to include the current SID in each absolute URL on the page. Hence, when the user elects to traverse an absolute link, the browser is facilitated with an authenticated URL which is directed with its SID to a page in a different path. In another embodiment, the content server may forego the filtering procedure as above-described and redirect an absolute URL to the authentication server for an update.

An absolute link may also be directed to a controlled file in a different domain. Again, such a request is redirected to the authentication server for processing of a new SID. An absolute link directed to an uncontrolled file is accorded an immediate access.

In another embodiment, a server access control may be maintained by programming the client browser to store an SID or a similar tag for use in each URL call to that particular server. This embodiment, however, requires a special browser which can handle such communications and is generally not suitable for the standard browser format common to the Web.

Another aspect of the invention is to monitor the frequency and duration of access to various pages both controlled and uncontrolled. A transaction log within a content server keeps a history of each client access to a page including the link sequence through which the page was accessed. Additionally, the content server may count the client requests exclusive of repeated requests from a common client. Such records provide important marketing feedback including user demand, access pattern, and relationships between customer demographics and accessed pages and access patterns.

The above and other features of the invention including various novel details of construction and combinations of parts will now be more particularly described with reference to the accompanying drawings and pointed out in the claims. It will be understood that the particular devices and methods embodying the invention are shown by way of illustration only and not as limitations of the invention. The principles and features of this invention may be employed in varied and numerous embodiments without departing from the scope of the invention.

BRIEF DESCRIPTION OF THE DRAWINGS

FIG. 5 is an example of an authorization form page.

DETAILED DESCRIPTION OF THE INVENTION

Figure 1:
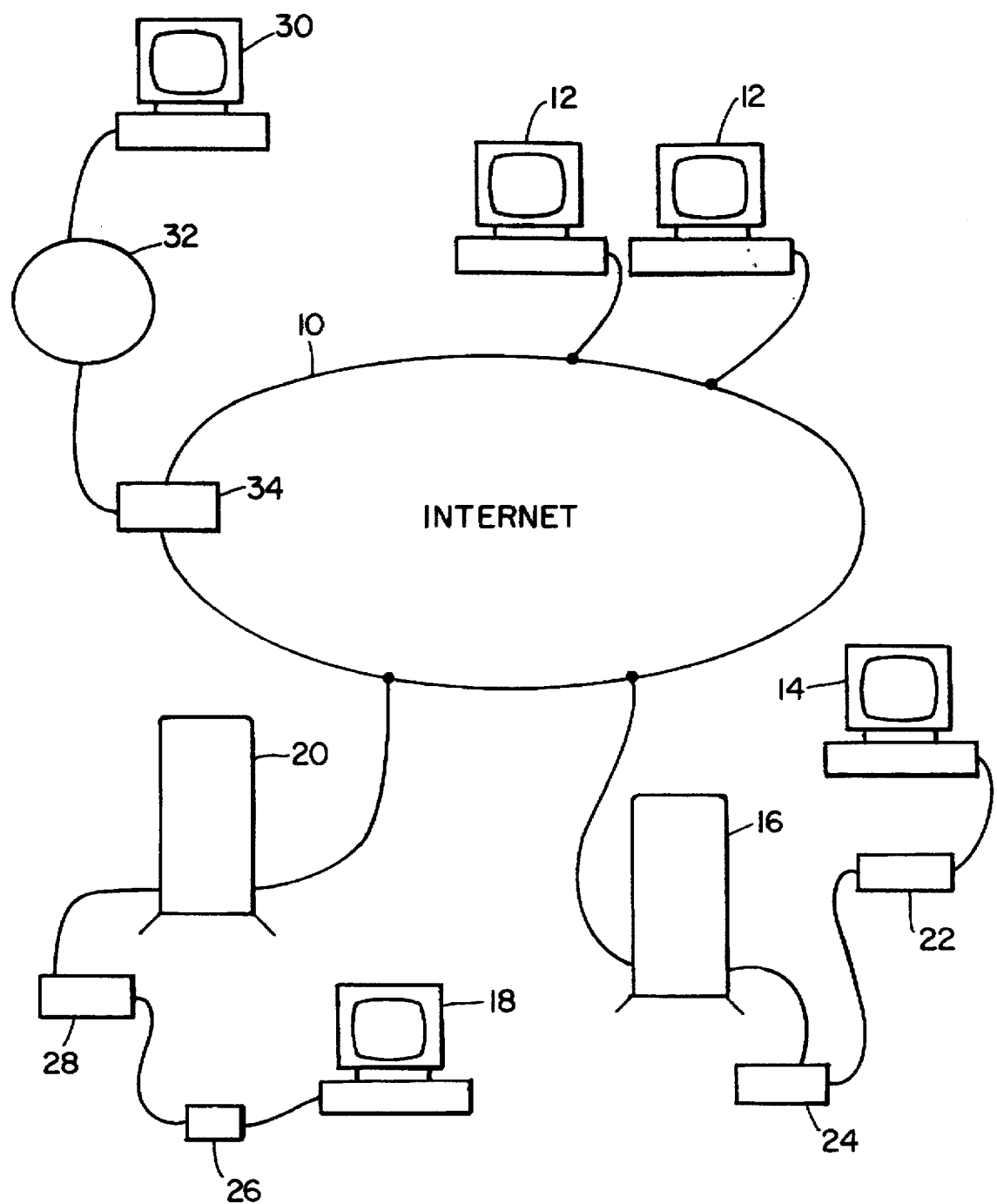
FIG. 1 is a diagram illustrating the Internet operation.

Referring now to the drawings, FIG. 1 is a graphical illustration of the Internet. The Internet 10 is a network of millions of interconnected computers 12 including systems owned by Internet providers 16 and information systems (BBS) 20 such as Compuserve or America Online. Individual or corporate users may establish connections to the Internet in several ways. A user on a home PC 14 may purchase an account through the Internet provider 16. Using a modem 22, the PC user can dial up the Internet provider to connect to a high speed modem 24 which, in turn, provides a full service connection to the Internet. A user 18 may also make a somewhat limited connection to the Internet through a BBS 20 that provides an Internet gateway connection to its customers.

Figure 2A:
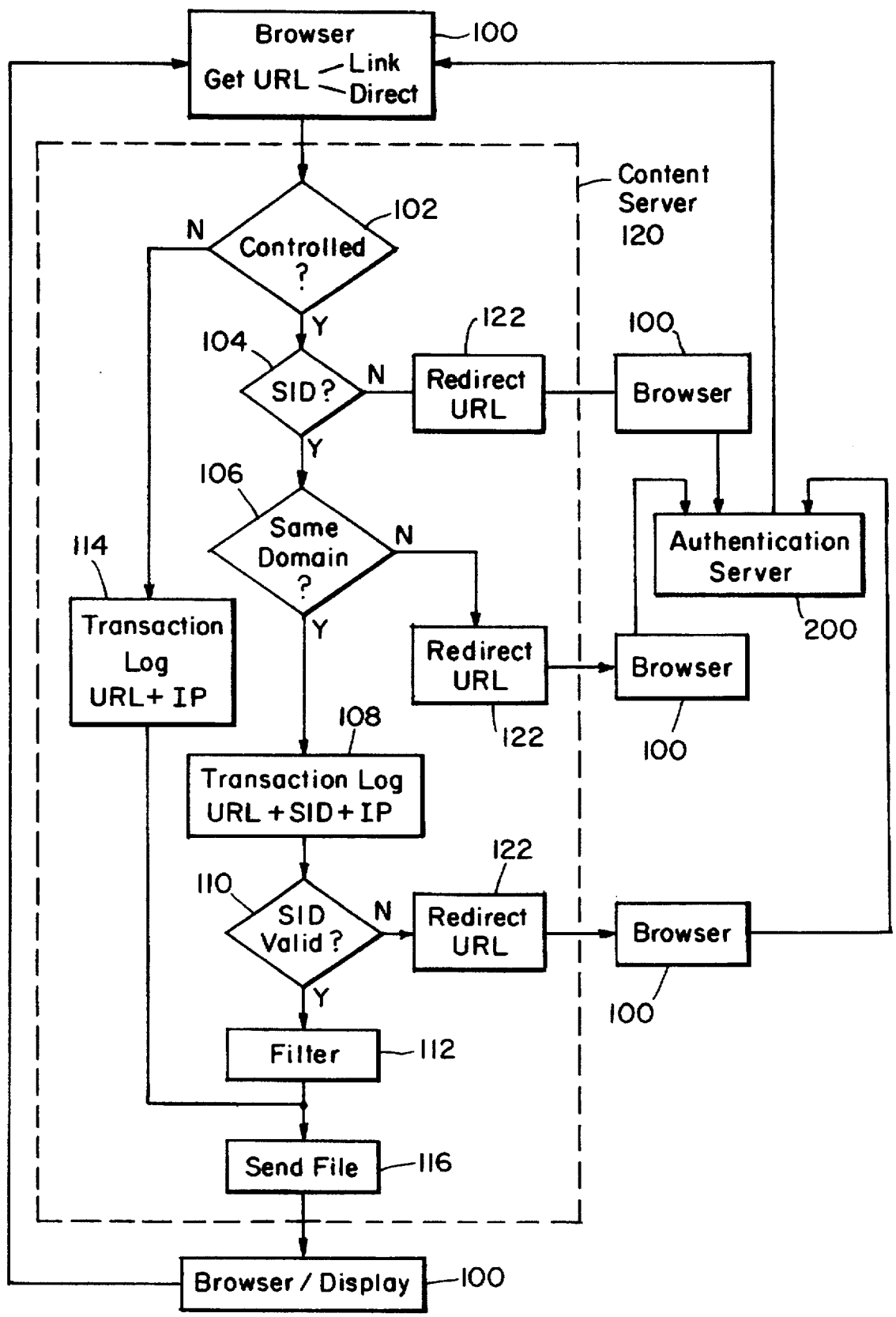
FIG. 2A is a flowchart describing the preferred method of Internet server access control and monitoring.
Figure 4:
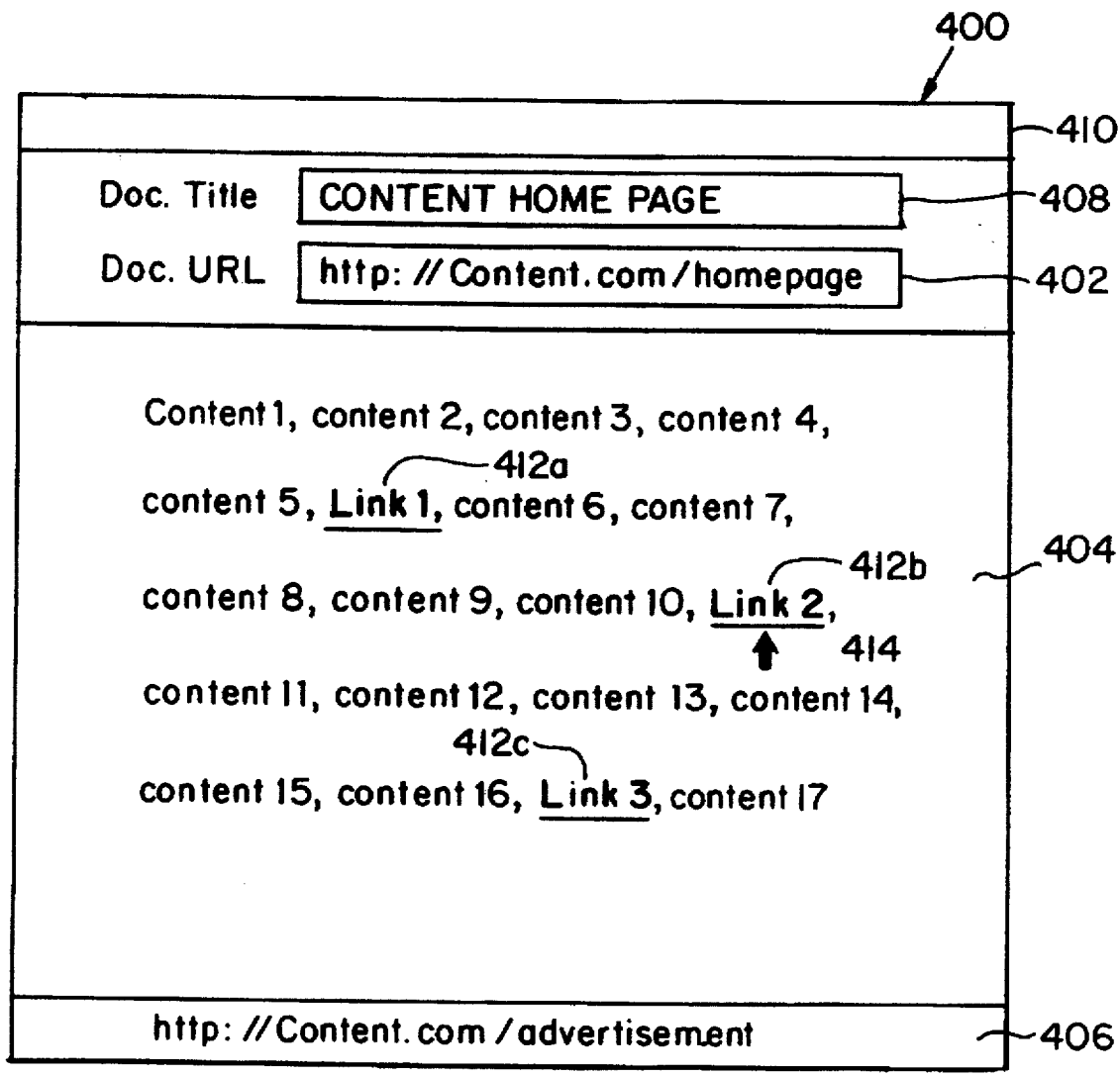
FIG. 4 is an example of a World Wide Web page.

FIG. 2A is a flowchart detailing the preferred process of the present invention and FIG. 4 illustrates a sample Web page displayed at a client by a browser. The page includes text 404 which includes underlined link text 412. The title bar 408 and URL bar 402 display the title and URL of the current web page, respectively. As shown in FIG. 4, the title of the page is "Content Home Page" and the corresponding URL is "http://content.com/homepage". When a cursor 414 is positioned over link text 412b, the page which would be retrieved by clicking a mouse is typically identified in a status bar 406 which shows the URL for that link. In this example the status bar 406 shows that the URL for the pointed link 412b is directed to a page called "advertisement", in a commercial content server called "content". By clicking on the link text, the user causes the browser to generate a URL GET request at 100 in FIG. 2A. The browser forwards the request to a content server 120, which processes the request by first determining whether the requested page is a controlled document 102. If the request is directed to an uncontrolled page, as in "advertisement" page in this example, the content server records the URL and the IP address, to the extent it is available, in the transaction log 114. The content server then sends the requested page to the browser 116 for display on the user computer 117.

If the request is directed to a controlled page, the content server determines whether the URL contains an SID 102. For example, a URL may be directed to a controlled page name "report", such as "http://content.com/report", that requires an SID. If no SID is present, as in this example, the content server sends a "REDIRECT" response 122 to the browser 100 to redirect the user's initial request to an authentication server 200 to obtain a valid SID. The details of the authentication process are described in FIG. 2B and will be discussed later, but the result of the process is an SID provided from the authentication server to the client. In the above example, a modified URL appended with an SID may be: "http://content.com/[SID]/report". The preferred SID is a sixteen character ASCII string that encodes 96 bits of SID data, 6 bits per character. It contains a 32-bit digital signature, a 16-bit expiration date with a granularity of one hour, a 2-bit key identifier used for key management, an 8-bit domain comprising a set of information files to which the current SID authorizes access, and a 22-bit user identifier. The remaining bits are reserved for expansion. The digital signature is a cryptographic hash of the remaining items in the SID and the authorized IP address which are encrypted with a secret key which is shared by the authentication and content servers.

If the initial GET URL contains a SID, the content server determines whether the request is directed to a page within the current domain 106. If the request having a SID is directed to a controlled page of a different domain, the SID is no longer valid and, again, the user is redirected to the authentication server 122.

If the request is for a controlled page within the current domain, the content server proceeds to log the request URL, tagged with SID, and the user IP address in the transaction log 108. The content server then validates the SID 110. Such validation includes the following list of checks: (1) the SID's digital signature is compared against the digital signature computed from the remaining items in the SID and the user IP address using the secret key shared by the authentication and content servers; (2) the domain field of the SID is checked to verify that it is within the domain authorized; and (3) the EXP field of the SID is checked to verify that it is later than the current time.

If the validation passes, the content server searches the page to be forwarded for any absolute URL links contained therein 112, that is, any links directed to controlled documents in different content servers. The content server augments each absolute URL with the current SID to facilitate authenticated accesses across multiple content servers. The requested page as processed is then transmitted to the client browser for display 117. The user viewing the requested Web page may elect to traverse any link on that page to trigger the entire sequence again 100.

Figure 2B:
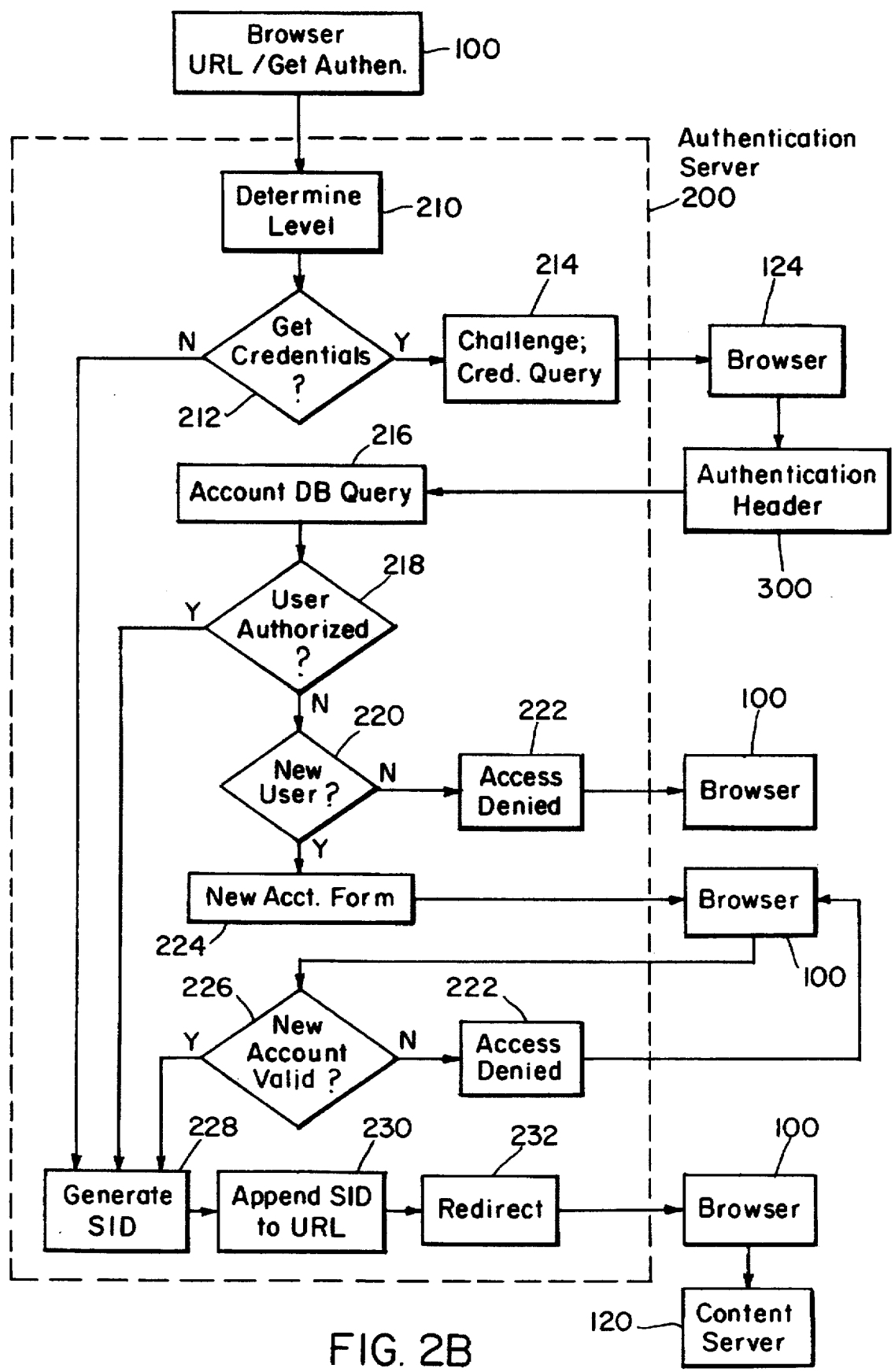
FIG. 2B is a related flowchart describing the details of the authentication process.

FIG. 2B describes the details of the authentication process. The content server may redirect the client to an authentication server. The REDIRECT URL might be: "http://auth.com/authenticate?domain=[domain]&URL= http://content.com/report". That URL requests authentication and specifies the domain and the initial URL. In response to the REDIRECT, the client browser automatically sends a GET request with the provided URL.

Whenever the content server redirects the client to the authentication server 200, the authentication server initiates the authorization process by validating that it is for an approved content server and determining the level of authentication required for the access requested 210. Depending on this level, the server may challenge the user 212 for credentials. If the request is for a low level document, the authentication may issue an appropriate SID immediately 228 and forego the credential check procedures. If the document requires credentials, the authentication server sends a "CHALLENGE" response which causes the client browser to prompt the user for credentials 214. A preferred credential query typically consists of a request for user name and password. If the user is unable to provide a password, the access is denied. The browser forms an authorization header 300 from the information provided, and resends a GET request to the authentication server using the last URL along with an authorization header. For example, a URL of such a GET request may be: "http://auth.com/ authenticate?domain=[domain]&URL=http://content.com/ report and the authorization header may be:"AUTHORIZE: [authorization]".

Upon receiving the GET request, the authentication server queries an account database 216 to determine whether the user is authorized 218 to access the requested document. A preferred account database may contain a user profile which includes information for identifying purposes, such as client IP address and password, as well as user demographic information, such as user age, home address, hobby, or occupation, for later use by the content server. If the user is authorized, an SID is generated 228 as previously described. If the user is not cleared for authorization, the authentication server checks to see if the user qualifies for a new account 220. If the user is not qualified to open a new account, a page denying access 222 is transmitted to the client browser 100. If the user is qualified, the new user is sent a form page such as illustrated in FIG. 5 to initiate a real-time on-line registration 224. The form may, for example, require personal information and credit references from the user. The browser is able to transmit the data entered by the user in the blanks 502 as a "POST" message to the authentication server. A POST message causes form contents to be sent to the server in a data body other than as part of the URL. If the registration form filled out by the new user is valid 226, an appropriate SID is generated 228. If the registration is not valid, access is again denied 222.

An SID for an authorized user is appended ("tagged") 230 to the original URL directed to a controlled page on the content server. The authentication server then transmits a REDIRECT response 232 based on the tagged URL to the client browser 100. The modified URL, such as "http://content.com/[SID]/report" is automatically forwarded to the content server 120.

Figure 3:
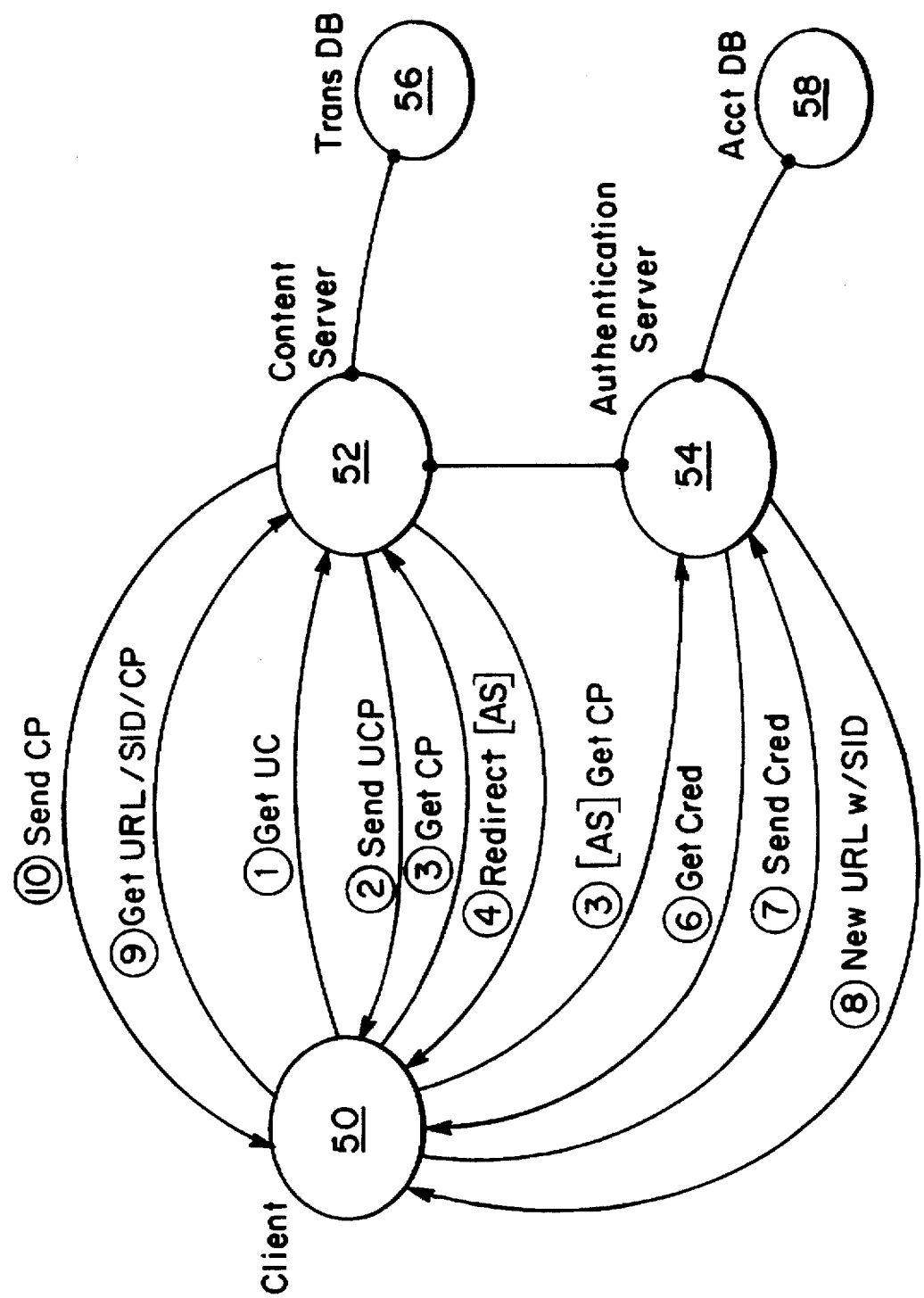
FIG. 3 illustrates an example of a client-server exchange session involving the access control and monitoring method of the present invention.

FIG. 3, illustrates a typical client-server exchange involving the access control and monitoring method of the present invention. In Step 1, the client 50 running a browser transmits a GET request through a network for an uncontrolled page (UCP). For example, the user may request an advertisement page by transmitting a URL "http://content.com/advertisement", where "content.com" is the server name and "advertisement" is the uncontrolled page name. In Step 2, the content server 52 processes the GET request and transmits the requested page, "advertisement". The content server also logs the GET request in the transaction database 56 by recording the URL, the client IP address, and the current time.

In Step 3, the user on the client machine may elect to traverse a link in the advertisement page directed to a controlled page (CP). For example, the advertisement page may contain a link to a controlled page called "report". Selecting this link causes the client browser 50 to forward a GET request through a URL which is associated with the report file "http://content.com/report". The content server 52 determines that the request is to a controlled page and that the URL does not contain an SID. In Step 4, the content server transmits a REDIRECT response to the client, and, in Step 5, the browser automatically sends the REDIRECT URL to the authentication server 54. The REDIRECT URL sent to the authentication server may contain the following string:

"http://auth.com/authenticate?domain=[domain]&URL= http://content.com/report".

The authentication server processes the REDIRECT and determines whether user credentials (CRED) are needed for authorization. In Step 6, the authentication server transmits a "CHALLENGE" response to the client. As previously described, typical credentials consist of user name and password. An authorization header based on the credential information is then forwarded by the client browser to the authentication server. For example, a GET URL having such an authorization header is:

"http://autho.com/authenticate?domain=[domain]&URL=http://content.com/report and the authorization header may be: "AUTHORIZE:[authorization]". The authentication server processes the GET request by checking the Account Database 58. If a valid account exists for the user, an SID is issued which authorizes access to the controlled page "report" and all the other pages within the domain.

As previously described, the preferred SID comprises a compact ASCII string that encodes a user identifier, the current domain, a key identifier, an expiration time, the client IP address, and an unforgeable digital signature. In Step 8, the authentication server redirects the client to the tagged URL, "http://content.com/[SID]/report", to the client. In Step 9, the tagged URL is automatically forwarded by the browser as a GET request to the content server. The content server logs the GET request in the Transaction database 56 by recording the tagged URL, the client IP address, and the current time. In Step 10, the content server, upon validating the SID, transmits the requested controlled page "report" for display on the client browser.

According to one aspect of the present invention, the content server periodically evaluates the record contained in the transaction log 56 to determine the frequency and duration of accesses to the associated content server. The server counts requests to particular pages exclusive of repeated requests from a common client in order to determine the merits of the information on different pages for ratings purposes. By excluding repeated calls, the system avoids distortions by users attempting to "stuff the ballot box." In one embodiment, the time intervals between repeated requests by a common client are measured to exclude those requests falling within a defined period of time.

Additionally, the server may, at any given time, track access history within a client-server session. Such a history profile informs the service provider about link transversal frequencies and link paths followed by users. This profile is produced by filtering transaction logs from one or more servers to select only transactions involving a particular user ID (UID). Two subsequent entries, A and B, corresponding to requests from a given user in these logs represent a link traversal from document A to document B made by the user in question. This information may be used to identify the most popular links to a specific page and to suggest where to insert new links to provide more direct access. In another embodiment, the access history is evaluated to determine traversed links leading to a purchase of a product made within commercial pages. This information may be used, for example, to charge for advertising based on the number of link traversals from an advertising page to a product page or based on the count of purchases resulting from a path including the advertisement. In this embodiment, the server can gauge the effectiveness of advertising by measuring the number of sales that resulted from a particular page, link, or path of links. The system can be configured to charge the merchant for an advertising page based on the number of sales that resulted from that page.

According to another aspect of the present invention, a secondary server, such as the authentication server 200 in FIG. 2B, may access a prearranged user profile from the account database 216 and include information based on such a profile in the user identifier field of the SID. In a preferred embodiment, the content server may use such an SID to customize user requested pages to include personalized content based on the user identifier field of the SID.

In another aspect of the invention, the user may gain access to domain of servers containing journals or publications through a subscription. In such a situation, the user may purchase the subscription in advance to gain access to on-line documents through the Internet. The user gains access to a subscribed document over the Internet through the authorization procedure as described above where an authorization indicator is preferably embedded in a session identifier. In another embodiment, rather than relying on a prepaid subscription, a user may be charged and billed each time he or she accesses a particular document through the Internet. In that case, authorization may not be required so long as the user is fully identified in order to be charged for the service. The user identification is most appropriately embedded in the session identifier described above.

Figure 6:
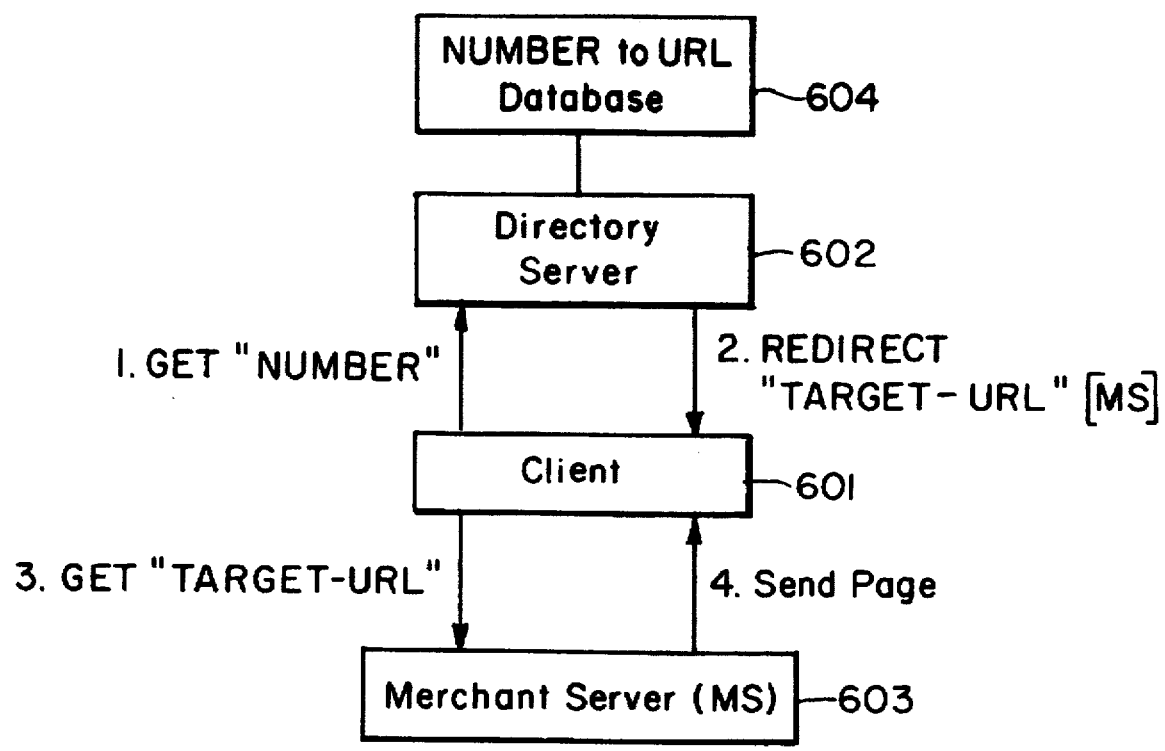
FIG. 6 is a diagram describing the details of the translation of telephone numbers to URLs.

In another aspect of the invention, facilities are provided to allow users to utilize conventional telephone numbers or other identifiers to access merchant services. These merchant services can optionally be protected using SIDs. In a preferred embodiment, as shown in FIG. 6, a Web browser client 601 provides a "dial" command to accept a telephone number from a user, as by clicking on a "dial" icon and inputting the telephone number through the keyboard. The browser then constructs a URL of the form "http://directory.net/NUMBER", where NUMBER is the telephone number or other identifier specified by the user. The browser then performs a GET of the document specified by this URL, and contacts directory server 602, sending the NUMBER requested in Message 1.

In another embodiment, implemented with a conventional browser, client 601 uses a form page provided by directory server 602 that prompts for a telephone number or other identifier in place of a "dial" command, and Message 1 is a POST message to a URL specified by this form page.

Once NUMBER is received by directory server 602, the directory server uses database 604 to translate the NUMBER to a target URL that describes the merchant server and document that implements the service corresponding to NUMBER. This translation can ignore the punctuation of the number, therefore embedded parenthesis or dashes are not significant.

In another embodiment an identifier other than a number may be provided. For example, a user may enter a company name or product name without exact spelling. In such a case a "soundex" or other phonetic mapping can be used to permit words that sound alike to map to the same target URL. Multiple identifiers can also be used, such as a telephone number in conjunction with a product name or extension.

In Message 2, Directory server 602 sends a REDIRECT to client 601, specifying the target URL for NUMBER as computed from database 604. The client browser 601 then automatically sends Message 3 to GET the contents of this URL. Merchant server 603 returns this information in Message 4. The server 602 might have returned a Web page to the client to provide an appropriate link to the required document. However, because server 602 makes a translation to a final URL and sends a REDIRECT rather than a page to client 601, the document of message 4 is obtained without any user action beyond the initial dial input.

The Target URL contained in Message 3 can be an ordinary URL to an uncontrolled page, or it can be a URL that describes a controlled page. If the Target URL describes a controlled page then authentication is performed as previously described. The Target URL can also describe a URL that includes an SID that provides a preauthorized means of accessing a controlled page.

Among benefits of the "dial" command and its implementation is an improved way of accessing the Internet that is compatible with conventional telephone numbers and other identifiers. Merchants do not need to alter their print or television advertising to provide an Internet specific form of contact information, and users do not need to learn about URLs.

In the approach a single merchant server can provide multiple services that correspond to different external "telephone numbers" or other identifiers. For example, if users dial the "flight arrival" number they could be directed to the URL for the arrival page, while, if they dial the "reservations" number, they would be directed to the URL for the reservations page. A "priority gold" number could be directed to a controlled page URL that would first authenticate the user as belonging to the gold users group, and then would provide access to the "priority gold" page. An unpublished "ambassador" number could be directed to a tagged URL that permits access to the "priority gold" page without user authentication.

Equivalents

Those skilled in the art will know, or be able to ascertain using no more than routine experimentation, many equivalents to the specific embodiments or the invention described herein. These and all other equivalents are intended to be encompassed by the following claims.

-30-

```
/*
 * tclSidSup.c --
 *
 *      tcl SID pack/unpack/id routines
 *
 *  Steve Morris
 *  morris@openmarket.com
 */

/* #define debug 1 */ include <stdio.h>
include <sys/types.h>
#include <stdlib.h>
#include <unistd.h>
#ifdef __alpha
#include <sys/time.h>
#endif
#include <tcl.h>
#include "global.h"
#include "md5.h"

#ifdef debug
#define dbg_out(s) printf("%s\n", s);
#define dbg_outi(s,a) printf("%s %x\n", s,a);
#define dbg_outs(s,a) printf("%s %s\n", s,a);
#else
#define dbg_out(s)
#define dbg_outi(s,a)
#define dbg_outs(s,a)
endif /* external routines called
 */
        char * radix64decode_noslash(char *in, int len, int *output_len);
        char * radix64encode_noslash(char *in, int len);
        int compute_ihash(char *str);

#define     sid_rev_zero (0)

#define get_sid(lw,pos,mask) ((bsid[lw]>>pos) & mask)
#define put_sid(lw,pos,mask,data) {bsid[lw] &= ~(0xffffffff & (mask<<pos)); \
                                   bsid[lw] |= ((data & mask)<<pos); } define sig_lw       0
define sig_pos      0
define sig_mask     0xffffffff define kid_lw       1
define kid_pos      0
#define kid_mask     0x3
#define rev_lw       1
#define rev_pos      2
#define rev_mask     0x3
#define uid_lw       1
```

2.

-31-

```
#define uid_pos     4
#define uid_mask    0x3fffff
#define rsrv1_lw    1
#define rsrv1_pos   26
define rsrv1_mask  0x3f define dom_lw      2
define dom_pos     0
#define dom_mask    0xff
#define rsrv2_lw    2
#define rsrv2_pos   8
#define rsrv2_mask  0x3f
#define uctx_lw     2
#define uctx_pos    14
#define uctx_mask   0x3
#define exp_lw      2
#define exp_pos     16
define exp_mask    0xffff ifdef __sun__
define fix_endian(i,o)    { ecp = (char *) i; \
                             eda = (*ecp++)<<0; \
                             eda |= (*ecp++)<<8; \
                             eda |= (*ecp++)<<16; \
                             eda |= (*ecp)<<24; \
                             (int *) *o = eda;}
#else
/* #define fix_endian(i,o)    { (int *) *o = (int *) *i;} */
#define fix_endian(i,o)
#endif
```

```
/* TclUnpackSid[NoValidate]
 *     Converts a binary sid to the internal representation, and does minimal
 *     validation on the SID, the NoValidate version does even less.
 * Inputs:
 *     the sid          a sid, looks like "/@@u9GIg4QEAAAAABPn"
 * Returns:
 *     {%d %d %d %d}    on succes (dom uid keyid exp)
 * or ""                on failure
 *
 */ int TclUnpackSid(ClientData dummy, Tcl_Interp *interp,
                 int argc, char **argv)
    {
    char temp[512];
    int ret_status = 1;
    int i;
    int * bsid = NULL, act_hash;
    char ip_address[32]="", secret[200]="", *cp;
    unsigned char *ecp;
    unsigned int eda;
    char hash_buffer[512];

struct sid_info
        {
        unsigned int sig;
        unsigned int kid;
        unsigned int uid;
        unsigned int rev;
        unsigned int dom;
        unsigned int exp;
        unsigned int uctx;
        } esid;

if (argc != 2)
        {
        Tcl_AppendResult(interp, "wrong # args: should be \"", argv[0],
            " string\"", (char *) NULL);
        return TCL_ERROR;
        } ifdef test_ip
    strcpy(ip_address, test_ip);
#endif
#ifdef test_secret
    strcpy(secret, test_secret);
endif cp = Tcl_GetVar(interp, "sidip", TCL_GLOBAL_ONLY|TCL_LEAVE_ERR_MSG);
        if (cp != NULL) strncpy(ip_address, cp, 31);

cp = argv[1]+3;
        i = strlen(cp);
        if (i != 16) goto sid_bad;
```

-33-

```
/* first convert the SID back to binary*/
bsid = (int *) radix64decode_noslash(cp, i, &i);
if (bsid == NULL) goto sid_bad;
if (i != 12) goto sid_bad;

fix_endian(&bsid[0], &bsid[0]);
fix_endian(&bsid[1], &bsid[1]);
fix_endian(&bsid[2], &bsid[2]);

dbg_outi("sid[0]=",bsid[0]);
dbg_outi("sid[1]=",bsid[1]);
dbg_outi("sid[2]=",bsid[2]);

dbg_outi("sig =",get_sid(sig_lw,sig_pos,sig_mask));
dbg_outi("kid =",get_sid(kid_lw,kid_pos,kid_mask));
dbg_outi("uid =",get_sid(uid_lw,uid_pos,uid_mask));
dbg_outi("rev =",get_sid(rev_lw,rev_pos,rev_mask));
dbg_outi("dom =",get_sid(dom_lw,dom_pos,dom_mask));
dbg_outi("exp =",get_sid(exp_lw,exp_pos,exp_mask));
dbg_outi("uctx =",get_sid(uctx_lw,uctx_pos,uctx_mask));
dbg_outi("rs1 =",get_sid(rsrv1_lw,rsrv1_pos,rsrv1_mask));
dbg_outi("rs2 =",get_sid(rsrv2_lw,rsrv2_pos,rsrv2_mask));

/* check the SID version field */
if (get_sid(rev_lw,rev_pos,rev_mask) != sid_rev_zero) goto sid_bad;
if (get_sid(rsrv1_lw,rsrv1_pos,rsrv1_mask) != 0) goto sid_bad;
if (get_sid(rsrv2_lw,rsrv2_pos,rsrv2_mask) != 0) goto sid_bad;

/* unpack the sid */
esid.sig = get_sid(sig_lw,sig_pos,sig_mask);
esid.kid = get_sid(kid_lw,kid_pos,kid_mask);
esid.uid = get_sid(uid_lw,uid_pos,uid_mask);
esid.rev = get_sid(rev_lw,rev_pos,rev_mask);
esid.dom = get_sid(dom_lw,dom_pos,dom_mask);
esid.exp = get_sid(exp_lw,exp_pos,exp_mask);
esid.uctx = get_sid(uctx_lw,uctx_pos,uctx_mask);

dbg_outi("sig =",esid.sig);
dbg_outi("kid =",esid.kid);
dbg_outi("uid =",esid.uid);
dbg_outi("rev =",esid.rev);
dbg_outi("dom =",esid.dom);
dbg_outi("exp =",esid.exp);
dbg_outi("uctx =",esid.uctx);

sprintf(temp,"secret(%d)",esid.kid);
cp = Tcl_GetVar(interp, temp, TCL_GLOBAL_ONLY);
if (cp != NULL) strncpy(secret, cp, 199);

/* hash the sid and check the signature */
sprintf(hash_buffer, "%s%s%08x%08x", secret,ip_address,bsid[2],bsid[1]);
dbg_outs("hashing ->",hash_buffer);
act_hash = compute_ihash(hash_buffer);
fix_endian(&act_hash, &act_hash);
dbg_outi("expected hash=",bsid[0]);
dbg_outi("actual   hash=",act_hash);
if (act_hash != esid.sig) goto  sid_bad;

rtn_exit:
```

-34-

```
   if (bsid != NULL) free(bsid);
   if (ret_status) sprintf(interp->result,"{%d %d %d %d %d}",
        esid.dom,esid.uid,esid.kid,esid.exp,esid.uctx);
   else sprintf(interp->result,"");
   return TCL_OK;

sid_bad:
   ret_status = 0;
   goto rtn_exit;

exp_bad:
   ret_status = 0;
   goto rtn_exit;

}
```

-35-

```
int TclUnpackSidNoValidate(ClientData dummy, Tcl_Interp *interp,
                  int argc, char **argv)
   {
   char temp[512];
   int ret_status = 1;
   int i;
   int * bsid = NULL, act_hash;
   char ip_address[32]="", secret[200]="", *cp;
   unsigned char *ecp;
   unsigned int eda;
   char hash_buffer[512];

struct sid_info
      {
      unsigned int sig;
      unsigned int kid;
      unsigned int uid;
      unsigned int rev;
      unsigned int dom;
      unsigned int exp;
      unsigned int uctx;
      } esid;

if (argc != 2)
      {
      Tcl_AppendResult(interp, "wrong # args: should be \"", argv[0],
         " string\"", (char *) NULL);
      return TCL_ERROR;
      } ifdef test_ip
   strcpy(ip_address, test_ip);
#endif
#ifdef test_secret
   strcpy(secret, test_secret);
endif cp = Tcl_GetVar(interp, "sidip", TCL_GLOBAL_ONLY|TCL_LEAVE_ERR_MSG);
      if (cp != NULL) strncpy(ip_address, cp, 31);

cp = argv[1]+3;
      i = strlen(cp);
      if (i != 16) goto sid_bad;

/* first convert the SID back to binary*/
      bsid = (int *) radix64decode_noslash(cp, i, &i);
      if (bsid == NULL) goto sid_bad;
      if (i != 12) goto sid_bad;

fix_endian(&bsid[0], &bsid[0]);
      fix_endian(&bsid[1], &bsid[1]);
      fix_endian(&bsid[2], &bsid[2]);

dbg_outi("sid[0]=",bsid[0]);
      dbg_outi("sid[1]=",bsid[1]);
      dbg_outi("sid[2]=",bsid[2]);

dbg_outi("sig =",get_sid(sig_lw,sig_pos,sig_mask));
```

-36-

```
        dbg_outi("kid =",get_sid(kid_lw,kid_pos,kid_mask));
        dbg_outi("uid =",get_sid(uid_lw,uid_pos,uid_mask));
        dbg_outi("rev =",get_sid(rev_lw,rev_pos,rev_mask));
        dbg_outi("dom =",get_sid(dom_lw,dom_pos,dom_mask));
        dbg_outi("exp =",get_sid(exp_lw,exp_pos,exp_mask));
        dbg_outi("uctx =",get_sid(uctx_lw,uctx_pos,uctx_mask));
        dbg_outi("rs1 =",get_sid(rsrv1_lw,rsrv1_pos,rsrv1_mask));
        dbg_outi("rs2 =",get_sid(rsrv2_lw,rsrv2_pos,rsrv2_mask));

/* check the SID version field */
        if (get_sid(rev_lw,rev_pos,rev_mask) != sid_rev_zero) goto sid_bad;
        if (get_sid(rsrv1_lw,rsrv1_pos,rsrv1_mask) != 0) goto sid_bad;
        if (get_sid(rsrv2_lw,rsrv2_pos,rsrv2_mask) != 0) goto sid_bad;

/* unpack the sid */
        esid.sig = get_sid(sig_lw,sig_pos,sig_mask);
        esid.kid = get_sid(kid_lw,kid_pos,kid_mask);
        esid.uid = get_sid(uid_lw,uid_pos,uid_mask);
        esid.rev = get_sid(rev_lw,rev_pos,rev_mask);
        esid.dom = get_sid(dom_lw,dom_pos,dom_mask);
        esid.exp = get_sid(exp_lw,exp_pos,exp_mask);
        esid.uctx = get_sid(uctx_lw,uctx_pos,uctx_mask);

dbg_outi("sig =",esid.sig);
        dbg_outi("kid =",esid.kid);
        dbg_outi("uid =",esid.uid);
        dbg_outi("rev =",esid.rev);
        dbg_outi("dom =",esid.dom);
        dbg_outi("exp =",esid.exp);
        dbg_outi("uctx =",esid.uctx);

#if (1 == 0) /* disable validation for the novalidate case */
        sprintf(temp,"secret(%d)",esid.kid);
        cp = Tcl_GetVar(interp, temp, TCL_GLOBAL_ONLY);
        if (cp != NULL) strncpy(secret, cp, 199);

/* hash the sid and check the signature */
        sprintf(hash_buffer, "%s%s%08x%08x", secret,ip_address,bsid[2],bsid[1]);
        dbg_outs("hashing ->",hash_buffer);
        act_hash = compute_ihash(hash_buffer);
        fix_endian(&act_hash, &act_hash);
        dbg_outi("expected hash=",bsid[0]);
        dbg_outi("actual   hash=",act_hash);
        if (act_hash != esid.sig) goto  sid_bad;
endif rtn_exit:
        if (bsid != NULL) free(bsid);
        if (ret_status) sprintf(interp->result,"{%d %d %d %d %d}",
            esid.dom,esid.uid,esid.kid,esid.exp, esid.uctx);
        else sprintf(interp->result,"");
        return TCL_OK;

sid_bad:
        ret_status = 0;
        goto rtn_exit;

exp_bad:
```

-37-

```
    ret_status = 0;
    goto rtn_exit;

}
```

-38-

```c
/* TclPackSid
 *    Creates the ascii representation of a binary sid
 * Inputs:
 *    "{%d %d %d %d [%d]}  Dom uid keyid exp [uctx]
 * Returns:
 *    ascii bin_sid like   "/@@u9GIg4QEAAAAABPn"
 *
 */ int TclPackSid(ClientData dummy, Tcl_Interp *interp,
                    int argc, char **argv)
    {
    char temp[512];
    int bsid[3] = {0,0,0}, i, act_hash;
    unsigned char *ecp;
    unsigned int eda;

char ip_address[32], secret[200]="", *cp;
    int dom, uid, keyid, exp, uctx;
    char hash_buffer[512];

struct sid_info
       {
       unsigned int sig;
       unsigned int kid;
       unsigned int uid;
       unsigned int rev;
       unsigned int dom;
       unsigned int exp;
       unsigned int uctx;
       } esid;

if (argc != 2)
       {
       Tcl_AppendResult(interp, "wrong # args: should be \"", argv[0],
          " string\"", (char *) NULL);
       return TCL_ERROR;
       } i = sscanf(argv[1],"%d %d %d %d %d", &dom, &uid, &keyid, &exp, &uctx);
    dbg_outs("scanning...",argv[1]);
    dbg_outi("scan returned ",i);
    if (i == 4) {uctx = 0; i = 5;}
    if (i != 5) return TCL_ERROR;

esid.kid = keyid;
      esid.uid = uid;
      esid.dom = dom;
      esid.exp = exp;
      esid.uctx = uctx;
      dbg_outi("kid=",esid.kid);
      dbg_outi("uid=",esid.uid);
      dbg_outi("dom=",esid.dom);
      dbg_outi("exp=",esid.exp);
      dbg_outi("uctx=",esid.uctx);
```

-39-

```
#ifdef test_ip
    strcpy(ip_address, test_ip);
#endif
#ifdef test_secret
    strcpy(secret, test_secret);
endif
    cp = Tcl_GetVar(interp, "sidip", TCL_GLOBAL_ONLY);
    if (cp != NULL) strncpy(ip_address, cp, 31);

sprintf(temp,"secret(%d)",esid.kid);
    cp = Tcl_GetVar(interp, temp, TCL_GLOBAL_ONLY);
    if (cp != NULL) strncpy(secret, cp, 199);

put_sid(kid_lw,   kid_pos,   kid_mask,   esid.kid);
    put_sid(uid_lw,   uid_pos,   uid_mask,   esid.uid);
    put_sid(rsrv1_lw, rsrv1_pos, rsrv1_mask, 0);
    put_sid(rev_lw,   rev_pos,   rev_mask,   sid_rev_zero);
    put_sid(dom_lw,   dom_pos,   dom_mask,   esid.dom);
    put_sid(rsrv2_lw, rsrv2_pos, rsrv2_mask, 0);
    put_sid(exp_lw,   exp_pos,   exp_mask,   esid.exp);
    put_sid(uctx_lw,  uctx_pos,  uctx_mask,  esid.uctx);

dbg_outi("sid[0]=",bsid[0]);
    dbg_outi("sid[1]=",bsid[1]);
    dbg_outi("sid[2]=",bsid[2]);

sprintf(hash_buffer, "%s%s%08x%08x", secret,ip_address,bsid[2],bsid[1]);
    dbg_outs("ascii sid built ",hash_buffer);
    act_hash = compute_ihash(hash_buffer);
/*  fix_endian(&act_hash, &act_hash); */
    put_sid(sig_lw, sig_pos, sig_mask, act_hash);

/*  dbg_outi("sid[0]=",bsid[0]);
    dbg_outi("sid[1]=",bsid[1]);
    dbg_outi("sid[2]=",bsid[2]);    */

/*  fix_endian(&bsid[0], &bsid[0]); */
    fix_endian(&bsid[1], &bsid[1]);
    fix_endian(&bsid[2], &bsid[2]);

dbg_outi("sid[0]=",bsid[0]);
    dbg_outi("sid[1]=",bsid[1]);
    dbg_outi("sid[2]=",bsid[2]);

cp = radix64encode_noslash((char *) bsid, 12);
    if (cp == NULL) return TCL_ERROR;
    sprintf(temp,"/@@%s", cp);
    Tcl_SetResult(interp, temp, TCL_VOLATILE);
    if (cp != NULL) free(cp);
    return TCL_OK;

}
```

-40-

```c
/* TclIdSid
 *     Scans an ascii line and finds an ascii SID. (no validation though)
 * Inputs:
 *     lineoftext
 * Returns:
 *     ascii bin_sid, if a sid is found it is returned.
 *
 */ int TclIdSid(ClientData dummy, Tcl_Interp *interp,
                    int argc, char **argv)
   {
   char *sidp, *cp;

interp->result[0] = 0;

if (argc != 2)
      {
      interp->result = "wrong # args";
      return TCL_ERROR;
      }
   sidp = (char *) strstr(argv[1], "/@@");
   if (sidp == NULL) return TCL_OK;
   cp = (char *) strstr(sidp+1,"/");
   if ((cp == NULL) && (strlen(sidp) != 19)) return TCL_OK;
   if ((cp - sidp) != 19) return TCL_OK;
   strncpy(interp->result, sidp,19);
   interp->result[19] = 0;
   return TCL_OK;
   }

/*
 * Register commands with interpreter.
 */
int SidSupInit(Tcl_Interp *interp)
   {
   Tcl_CreateCommand(interp, "packsid",   TclPackSid,   NULL, NULL);
   Tcl_CreateCommand(interp, "unpacksid", TclUnpackSid, NULL, NULL);
   Tcl_CreateCommand(interp, "unpacksidnovalidate", TclUnpackSidNoValidate, NULL,
   Tcl_CreateCommand(interp, "issid",     TclIdSid,     NULL, NULL);
   return TCL_OK;
   }
```

```
/*
 *----------------------------------------------------------------
 *
 * compute_ihash --
 *
 *  Compute the MD5 hash for the specified string, returning the hash as
 *  a 32b xor of the 4 hash longwords.
 *
 * Results:
 *      hash int.
 *
 * Side effects:
 *      None.
 *----------------------------------------------------------------
 */
int compute_ihash(char *str)
{
    MD5_CTX md5;
    unsigned char hash[16];
    unsigned int *p1;
    unsigned int hashi = 0;

MD5Init(&md5);
    MD5Update(&md5, str, strlen(str));
    MD5Final(hash, &md5);
    p1 = (unsigned int *) hash;

hashi = *p1++;
    hashi ^= *p1++;
    hashi ^= *p1++;
    hashi ^= *p1++;
    return hashi;
}
```

-42-

```c
/*
 * ticket.c --
 *
 *      Commands for TICKET.
 *
 * Copyright 1995 by Open Market, Inc.
 * All rights reserved.
 *
 * This file contains proprietary and confidential information and
 * remains the unpublished property of Open Market, Inc. Use,
 * disclosure, or reproduction is prohibited except as permitted by
 * express written license agreement with Open Market, Inc.
 *
 * Steve Morris
 * morris@OpenMarket.com
 *
 * Created: Wed Mar 1 1995
 * $Source: /omi/proj/master/omhttpd/Attic/ticket.c,v $
 *
 */ if !defined(lint)
static const char rcsid[]="$Header: /omi/proj/master/omhttpd/Attic/ticket.c,v 2.
endif /*not lint*/ include <stdio.h>
include <sys/utsname.h>
#include "httpd.h"
#include "md5.h"
#include "ticket.h"

static TICKET_Server TicketServerData;
```

```
/*
 * This file implements all the ticket/sid related functions for the server.
 *
 * The region commands RequireSID and xxxxx can be used to limit
 * access to groups of files based on the authentication of the requestor.
 * The two commands are very similar, and only differ in the method used to
 * present the authentication data (via the URL) and in handling of the
 * failing access case. For failing TICKET's, a "not authorized" message is
 * generated. For failing (or absent) SID's, a REDIRECT (either local or via
 * CGI script) is performed to forward the request to an authentication server.
 *
 * RequireSID domain1 [domain2 ... domainn]
 *
 *      This command denies access unless the specified properties are
 *      true of the request. Only one RequireSID or xxxxx command can
 *      be used for a given region, though it may specify multiple domains.
 *
 *
 */
```

```
static int     ProcessRequires(ClientData clientData, Tcl_Interp *interp,
                               int argc, char **argv, int flavor);
static int     DomainNameCmd(ClientData clientData, Tcl_Interp *interp,
                             int argc, char **argv);
static int     GetDomain(char *domname, int dflt);
static char   *GetAsciiDomain(char *domname, char *dflt);
static int     compute_ihash(char *str);
static char   *computeHash(char *str);
static char   *GetSecret(int kid);
static int     GetKidByKeyID(char *keyID);
static char   *CreateSid(HTTP_Request *reqPtr, int dom, int uid, int kid,
                         int exp, int uctx);
static void    freeTicketReqData(void *dataPtr);
static void    DumpStatus(HTTP_Request *reqPtr);
static void    TICKET_DebugHooks(ClientData clientData, char *suffix,
                                 HTTP_Request *reqPtr);
static int ParseSid(HTTP_Request *reqPtr);
static int ParseTicket(HTTP_Request *reqPtr);
static char   *fieldParse(char *str, char sep, char **endptr);
void TICKET_ConfigCheck();
void DumpRusage(HTTP_Request *reqPtr);
```

```
/*
 *-----------------------------------------------------------------
 *
 * TICKET_RequireSidCmd --
 *
 *      Checks that the requested URL is authorized via SID to access this
 *      region. If the access is not authorized and we do not have a "remote
 *      authentication server" registered, then an "unauthorized message"
 *      is returned. If a "remote authentication server" has been
 *      declared, we REDIRECT to that server, passing the requested URL and
 *      required domain's as arguments.
 *
 * Results:
 *      Normal Tcl result, or a REDIRECT request.
 *
 * Side effects:
 *      Either an "unauthorized access" message or a REDIRECT in case of error.
 *
 *-----------------------------------------------------------------
 */
static int TICKET_RequireSidCmd(ClientData clientData, Tcl_Interp *interp,
                        int argc, char **argv)
    {
    if (TicketGlobalData(EnableSidEater)) return TCL_OK;
    return(ProcessRequires(clientData, interp,argc, argv, ticketSid));
    }
```

```
/*
*-----------------------------------------------------------------
*
* ProcessRequires --
*
*       Checks that the requested URL is authorized to access this
*       region. The error cases are treated differently for SID v.s. TICKET.
*       For Ticket's, an unauthorized access generates a returned error message.
*       For SID's, we first look to see if we are operating in "local authentica
*       mode", if we are, we generate a new SID, into the URL and re-process the
*       If not in "local" mode, we look for the presence of a remoteauthenticati
*       server, if we have one declared (in the conf file) we REDIRECT to it pas
*       the FULL url and a list of domains that would have been legal. If the
*       authentication server was not found we return an error message.
*
* Results:
*       Normal Tcl result, a local reprocess command, or a REDIRECT request.
*
* Side effects:
*       Either an "unauthorized access" message or a REDIRECT in case of error.
*
*-----------------------------------------------------------------
*/
static int ProcessRequires(ClientData clientData, Tcl_Interp *interp,
                           int argc, char **argv, int flavor)
{
    HTTP_Request *reqPtr = (HTTP_Request *) clientData;
    HTTP_Server  *serverPtr;
    TICKET_Request *ticketPtr;
    DString targetUrl;
    DString escapeUrl;
    int i, required_dom;
    int firstLegalDom = -1;
    char *NewSid, *cp;

DStringInit(&targetUrl);
    DStringInit(&escapeUrl);

/* fetch the server private and ticket specific extension data */
    serverPtr = reqPtr->serverPtr;
    ticketPtr = (TICKET_Request *) HT_GetReqExtData(reqPtr, TicketServerData.tic
    ASSERT (ticketPtr != NULL);

/* compare the requesting SID/Ticket<DOM> to authorized list of domains */
    /* a match OR any valid domain and a required domain of TicketFreeArea is su
    for (i = 1; i < argc; i++)
    {
      required_dom = GetDomain(argv[i],-1);
      if (required_dom != -1)
      {
        if (firstLegalDom == -1) firstLegalDom = required_dom;
        if ( (ticketPtr->sidDom == required_dom) ||
             (ticketPtr->valid && (ticketPtr->sidDom != -1) &&
              (required_dom == TicketGlobalData(FreeArea))) ||
             ((ticketPtr->ticketDom == required_dom) &&
              (time(0) <= ticketPtr->ticketExp) &&
              ((DStringLength(&ticketPtr->ticketIP) == 0) ||
```

```
            (strcmp(DStringValue(&ticketPtr->ticketIP), DStringValue(&reqPtr->r
    )
        {
        DStringFree(&targetUrl);
        DStringFree(&escapeUrl);
        return TCL_OK;
        }
    }
}

/* count the number of domain crossing that caused re-auth */
if ((flavor == ticketSid) && (ticketPtr->sidDom) != -1) IncTicketCounter(Cou /* authorization failed, if this was a sid url, and local auth is enabled */
/* or this was an access to the free area */
/* insert a new sid in the url, and REDIRECT back to the client */
if (TicketGlobalData(EnableLocalAuth) ||
    ((firstLegalDom == TicketGlobalData(FreeArea))
     && (flavor == ticketSid) && (firstLegalDom != -1)))
  {
  if ((DStringLength(&reqPtr->url) != 0) &&
      (DStringValue(&reqPtr->url)[0] != '/'))
    {
    HTTP_Error(reqPtr, NOT_FOUND, "access denied due to poorly formed url");
    DStringFree(&targetUrl);
    DStringFree(&escapeUrl);
    if (!ticketPtr->valid)
       DStringFree(&ticketPtr->sid);
    return TCL_RETURN ;
    }
  NewSid =  CreateSid(reqPtr,
            firstLegalDom, ticketPtr->uid,
            TicketGlobalData(CurrentSecret), TicketGlobalData(LocalAuthExp),
            ticketPtr->uctx);
  DStringFree(&ticketPtr->sid);
  DStringAppend(&ticketPtr->sid, NewSid, -1);
  ComposeURL(reqPtr, DStringValue(&reqPtr->url), &targetUrl);
  IncTicketCounter(CountLocalRedirects);
  HTTP_Error(reqPtr, REDIRECT, DStringValue(&targetUrl));
  DStringFree(&targetUrl);
  DStringFree(&escapeUrl);
  if (!ticketPtr->valid)
    DStringFree(&ticketPtr->sid);
  return TCL_RETURN;
  }

/* authorization failed, build the REDIRECT URL arg's. */
/* If present, REDIRECT to authentication server */
if ((DStringLength(&TicketGlobalData(AuthServer)) != 0) && (flavor == ticket
  {
  if ((DStringLength(&reqPtr->url) != 0) &&
      (DStringValue(&reqPtr->url)[0] != '/'))
    {
    HTTP_Error(reqPtr, NOT_FOUND, "access denied due to poorly formed url");
    DStringFree(&targetUrl);
    DStringFree(&escapeUrl);
    if (!ticketPtr->valid)
       DStringFree(&ticketPtr->sid);
```

```
        return TCL_RETURN ;
    }
    DStringAppend(&targetUrl, DStringValue(&TicketGlobalData(AuthServer)), -1)
    DStringAppend(&targetUrl, "?url=", -1);
    ComposeURL(reqPtr, DStringValue(&reqPtr->url), &escapeUrl);
    EscapeUrl(&escapeUrl);
    DStringAppend(&targetUrl,DStringValue(&escapeUrl), -1);
    DStringAppend(&targetUrl, "&domain=", -1);
    DStringTrunc(&escapeUrl, 0);
    DStringAppend(&escapeUrl, "{", -1);
    for (i=1; i < argc; i++)
    {
        cp = GetAsciiDomain(argv[i], NULL);
        if (cp != NULL)
        {
            DStringAppend(&escapeUrl, cp, -1);
            DStringAppend(&escapeUrl, " ", -1);
        }
    }
    DStringAppend(&escapeUrl, "}", -1);
    EscapeUrl(&escapeUrl);
    DStringAppend(&targetUrl,DStringValue(&escapeUrl), -1);
    DStringFree(&escapeUrl);
    HTTP_Error(reqPtr, REDIRECT, DStringValue(&targetUrl));
    IncTicketCounter(CountRemoteRedirects);
    DStringFree(&targetUrl);
    if (!ticketPtr->valid)
        DStringFree(&ticketPtr->sid);
    return TCL_RETURN;
}

/* authorization failed, if this is a ticket access, decode the */
/* reason and handle via a redirect to a handler, or punt a    */
/* no access message */
if ((flavor == ticketTicket) && (firstLegalDom != -1) && (ticketPtr->ticketD
{
    /* check For IP address restrictions */
    if ((DStringLength(&ticketPtr->ticketIP) != 0) &&
        (DStringLength(&TicketGlobalData(TicketAdrHandler)) != 0) &&
        (strcmp(DStringValue(&ticketPtr->ticketIP), DStringValue(&reqPtr->remo
    {
        DStringAppend(&targetUrl, DStringValue(&TicketGlobalData(TicketAdrHandle
        DStringAppend(&targetUrl, DStringValue(&ticketPtr->fields), -1);
        DStringAppend(&targetUrl, "&url=", -1);
        DStringAppend(&targetUrl, DStringValue(&reqPtr->url), -1);
        IncTicketCounter(CountTicketAddr);
        HTTP_Error(reqPtr, REDIRECT, DStringValue(&targetUrl));
        DStringFree(&targetUrl);
        return TCL_RETURN;
    }

/* check for expired tickets */
    if (time(0) > ticketPtr->ticketExp)
    {
        DStringAppend(&targetUrl, DStringValue(&TicketGlobalData(TicketExpHandle
        DStringAppend(&targetUrl, DStringValue(&ticketPtr->fields), -1);
        DStringAppend(&targetUrl, "&url=", -1);
        DStringAppend(&targetUrl, DStringValue(&reqPtr->url), -1);
        IncTicketCounter(CountExpiredTicket);
```

48

```
        HTTP_Error(reqPtr, REDIRECT, DStringValue(&targetUrl));
        DStringFree(&targetUrl);
        return TCL_RETURN;
        }
    }

/* no handler, punt a message */
HTTP_Error(reqPtr, FORBIDDEN, "access denied by Require ticket/sid region co
IncTicketCounter(CountNoRedirects);
if (!ticketPtr->valid)
DStringFree(&ticketPtr->sid);
DStringFree(&targetUrl);
DStringFree(&escapeUrl);
return TCL_RETURN;
}
```

```
/*
 *----------------------------------------------------------------
 *
 * Get[Ascii]Domain --
 *
 *      These routine performs an ascii to binary domain name lookup,
 *      indexed by 'key') from the server's domain name catalog. Name/number
 *      pair's are loaded into the catalog at configuration time with the
 *      with the "Domain" configuration command. The Ascii version returns
 *      a pointer to a character string that represents the domain number.
 *      The non Ascii version returns an integer representing the domain number.
 *
 * Results:
 *      Integer value of domain.  If no domain is available, returns deflt.
 *
 * Side effects:
 *      None.
 *
 *----------------------------------------------------------------
 */
static int GetDomain(char *domname, int deflt)
    {
    HashEntry *entryPtr;
    DString DomName;

DStringInit(&DomName);
    DStringAppend(&DomName, domname, -1);
    strtolower(DStringValue(&DomName));

entryPtr = FindHashEntry(&TicketServerData.Domains, DStringValue(&DomName));
    DStringFree(&DomName);
    if (entryPtr == NULL) return deflt;
    return (int) GetHashValue(entryPtr);
    } static char * GetAsciiDomain(char *domname, char *deflt)
    {
    HashEntry *entryPtr;
    static char buffer[64];
    DString DomName;

DStringInit(&DomName);
    DStringAppend(&DomName, domname, -1);
    strtolower(DStringValue(&DomName));

entryPtr = FindHashEntry(&TicketServerData.Domains, DStringValue(&DomName));
    DStringFree(&DomName);
    if (entryPtr == NULL) return deflt;
    sprintf(buffer,"%d", (int) GetHashValue(entryPtr));
    return buffer;
    }
```

```
/*
 *-------------------------------------------------------------------------
 *
 * TICKET_InsertLocalSid --
 *
 *      Given a URL, inspect it to see if it refers to the local server/port
 *      if it does, and it does not already contain a SID, insert one if
 *      the current request included one. Note, for port 80 access we look
 *      for a match with and without the port specifier.
 *
 * Results:
 *      None.
 *
 * Side effects:
 *      A SID may be inserted into the URL.
 *
 *-------------------------------------------------------------------------
 */
void TICKET_InsertLocalSid(HTTP_Request *reqPtr, DString *result)
    {
    HTTP_Server *serverPtr;
    TICKET_Request *ticketPtr;
    char tmp[32];
    DString pattern1;
    DString pattern2;
    DString tmp_url;
    DString *hitPattern = NULL;

ticketPtr = (TICKET_Request *) HT_GetReqExtData(reqPtr, TicketServerData.tic
    if (ticketPtr == NULL) return;
    serverPtr = reqPtr->serverPtr;

DStringInit(&pattern1);
    DStringInit(&pattern2);
    DStringInit(&tmp_url);

DStringAppend(&pattern1, "http://", -1);
    DStringAppend(&pattern1, DStringValue(&serverPtr->serverName), -1);
    DStringAppend(&pattern2, DStringValue(&pattern1), -1);
    sprintf(tmp, ":%d", serverPtr->server_port);
    DStringAppend(&pattern1, tmp, -1);

if ((DStringLength(result) >= DStringLength(&pattern1)) &&
        (strncasecmp(DStringValue(&pattern1), DStringValue(result), DStringLengt
       hitPattern = &pattern1;
    else
    if ((serverPtr->server_port == 80) &&
        (DStringLength(result) >= DStringLength(&pattern2)) &&
        (strncasecmp(DStringValue(&pattern2), DStringValue(result), DStringLengt
       hitPattern = &pattern2;

if (hitPattern != NULL)
       {
       DStringAppend(&tmp_url, DStringValue(hitPattern), -1);
       DStringAppend(&tmp_url, DStringValue(&ticketPtr->sid), -1);
       DStringAppend(&tmp_url, &DStringValue(result)[DStringLength(hitPattern)],
       DStringFree(result);
```

51

```
  DStringAppend(result, DStringValue(&tmp_url), -1);
  DStringFree(&tmp_url);
  }
DStringFree(&pattern1);
DStringFree(&pattern2);
DStringFree(&tmp_url);
}
```

```
/*
 *-----------------------------------------------------------------
 *
 * CreateSid --
 *
 *      This routine takes the passed arguments and creates a sid.
 *
 * Results:
 *      A sid.
 *
 * Side effects:
 *
 *-----------------------------------------------------------------
 */
char * CreateSid(HTTP_Request *reqPtr, int dom, int uid, int kid,
                 int exp, int uctx)
{
    int bsid[3]= {0,0,0};
    char temp_str[512];
    DString hash;
    int act_hash;
    static char sid[64];
    unsigned int expire_time;
    char *secret;
    char *hashP;
    char *cp;
    unsigned char *ecp;
    unsigned int eda;
    int endian = 1;

DStringInit(&hash);
    expire_time = time(0)+ exp;

put_sid(dom_lw,    dom_pos,   dom_mask,   dom);
    put_sid(uid_lw,    uid_pos,   uid_mask,   uid);
    put_sid(kid_lw,    kid_pos,   kid_mask,   kid);
    put_sid(exp_lw,    exp_pos,   exp_mask,   (expire_time>>exp_shft_amt));
    put_sid(uctx_lw,   uctx_pos,  uctx_mask,  uctx);
    put_sid(rev_lw,    rev_pos,   rev_mask,   sid_rev_zero);

secret = GetSecret(kid);
    ASSERT (secret != NULL);
    DStringAppend(&hash, secret, -1);
    DStringAppend(&hash, DStringValue(&reqPtr->remoteAddr), -1);
    sprintf(temp_str, "%08x%08x", bsid[2],bsid[1]);
    DStringAppend(&hash, temp_str, -1);
    /* format of the hash string is %s%s%08x%08x", secret,ip_addr,bsid[2],bsid[1]

hashP = DStringValue(&hash);
    act_hash = compute_ihash(hashP);
    while (*hashP != 0) *hashP++ = 0;
    DStringFree(&hash);

/*  fix_endian(&act_hash, ecp, eda); */
```

53

```
    .put_sid(sig_lw, sig_pos, sig_mask, act_hash)

/*  fix_endian(&bsid[0], ecp, eda); */
    fix_endian(&bsid[1], ecp, eda);
    fix_endian(&bsid[2], ecp, eda);

#if (1 == 0)
    DumpSid();
endif cp = radix64encode_noslash((char *) bsid, 12);
    strcpy(sid, SID_prefix);
    strcat(sid, cp);
    free(cp);
    return(sid);
    }
```

```
/*
 *------------------------------------------------------------------------
 *
 * compute_ihash --
 *
 * Compute the MD5 hash for the specified string, returning the hash as
 * a 32b xor of the 4 hash longwords.
 *
 * Results:
 *      hash int.
 *
 * Side effects:
 *      None.
 *------------------------------------------------------------------------
 */
static int compute_ihash(char *str)
    {
    MD5_CTX md5;
    unsigned char hash[16];
    unsigned int *p1;
    unsigned int hashi = 0;

MD5Init(&md5);
    MD5Update(&md5, (unsigned char *) str, strlen(str));
    MD5Final(hash, &md5);
    p1 =   (unsigned int *) hash;

hashi = *p1++;
    hashi ^= *p1++;
    hashi ^= *p1++;
    hashi ^= *p1++;
    return hashi;
    }
```

55

```
/*
 *----------------------------------------------------------------------
 *
 * computeHash --
 *
 *  Compute the MD5 hash for the specified string, returning the hash as
 *  a 32-character hex string.
 *
 * Results:
 *      Pointer to static hash string.
 *
 * Side effects:
 *      None.
 *----------------------------------------------------------------------
 */
static char *computeHash(char *str)
{
    int i;
    MD5_CTX md5;
    unsigned char hash[16];
    static char hashstr[33];
    char *q;

MD5Init(&md5);
    MD5Update(&md5, (unsigned char *) str, strlen(str));
    MD5Final(hash, &md5);
    q = hashstr;
    for(i=0; i<16; i++) {
        sprintf(q, "%02x", hash[i]);
        q += 2;
    }
    *q = '\0';
    return hashstr;
}
```

56

```
/*
 *----------------------------------------------------------------------
 *
 * TICKET_ParseTicket --
 *
 *      Called by dorequest, before any region commands or mount handlers
 *      have run. We parse and handle incomeing sid's and tickets.
 *
 * Results:
 *      None.
 *
 * Side effects:
 *
 *----------------------------------------------------------------------
 */ int TICKET_ParseTicket(HTTP_Request *reqPtr)
    {
    int status = HT_OK;

IncTicketCounter(CountTotalUrl);

status = ParseSid(reqPtr);
    if (TicketGlobalData(EnableTicket) && (status == HT_OK)) status = ParseTicke
    return status;
    }
```

57

```
/*
 *-----------------------------------------------------------------------
 *
 * ParseSid --
 *
 *      Called by TICKET_ParseTicket, before any region commands or mount handle
 *      have run. We parse and handle incomeing sid's.
 *
 * Results:
 *      None.
 *
 * Side effects:
 *
 *-----------------------------------------------------------------------
 */ int ParseSid(HTTP_Request *reqPtr)
{
    TICKET_Request *ticketPtr;
    HTTP_Server *serverPtr;
    DString hash;
    int i;
    char *cp, *cp1;
    int *bsid=NULL, act_hash;
    unsigned int cur_tim, tdif, exp_tim;
    char *secret;
    char temp_str[512];
    char *hashP;
    int sid_ok = 0;
    unsigned char *ecp;
    unsigned int eda;
    int endian = 1;
    int ip1,ip2,ip3,ip4;

/* fetch the server private ticket extension data */
    /* note that this sets up a default ticket block for both SID's and Ticket a
    serverPtr = reqPtr->serverPtr;
    ticketPtr = (TICKET_Request *) HT_GetReqExtData(reqPtr, TicketServerData.tic
    ASSERT (ticketPtr == NULL);

ticketPtr = (TICKET_Request *) Malloc(sizeof(TICKET_Request));
    HT_AddReqExtData(reqPtr, TicketServerData.ticketExtensionId, ticketPtr, free
    DStringInit(&ticketPtr->rawUrl);
    DStringInit(&ticketPtr->sid);
    DStringInit(&ticketPtr->fields);
    DStringInit(&ticketPtr->signature);
    DStringInit(&ticketPtr->ticketIP);
    ticketPtr->valid    = 0;
    ticketPtr->sidDom   = -1;
    ticketPtr->ticketDom = -1;
    ticketPtr->ticketExp = -1;
    ticketPtr->uid      = 0;
    ticketPtr->uctx     = 0;
    sscanf(DStringValue(&reqPtr->remoteAddr), "%d.%d.%d.%d", &ip1, &ip2, &ip3, &
    ticketPtr->uid = (((ip1+ip2)<<24) | ((ip3+ip4)<<16) | (rand() & 0xFFFF));
    ticketPtr->uctx = 1;
```

```
/* we are done if sids are not enabled, or this url does not have a sid */
if (!(TicketGlobalData(EnableSid))) return HT_OK;
cp1 = DStringValue(&reqPtr->url);
if (strstr(cp1, SID_prefix) != cp1)
  return HT_OK;
if (strlen(cp1) == sidLength)
  {
  DStringAppend(&reqPtr->url, "/", -1);
  DStringAppend(&reqPtr->path, "/", -1);
  cp1 = DStringValue(&reqPtr->url);
  }
cp = strchr(cp1+sizeof(SID_prefix),'/');
if ((cp - cp1) != sidLength)
  return HT_OK;
IncTicketCounter(CountSidUrl);

DStringInit(&hash);

/* if sid eater is enabled, rewrite the url without the sid, and reprocess t
if (TicketGlobalData(EnableSidEater))
  {
  DStringAppend(&hash, DStringValue(&reqPtr->url), -1);
  DStringFree(&reqPtr->url);
  DStringAppend(&reqPtr->url, DStringValue(&hash)+sidLength, -1);
  DStringTrunc(&hash, 0);
  DStringAppend(&hash, DStringValue(&reqPtr->path), -1);
  DStringFree(&reqPtr->path);
  DStringAppend(&reqPtr->path, DStringValue(&hash)+sidLength, -1);
  DStringFree(&hash);
  IncTicketCounter(CountDiscardedSidUrl);
  return HT_OK;
  }

DStringAppend(&ticketPtr->sid,  DStringValue(&reqPtr->url), sidLength);

/* first convert the SID back to binary*/
i = DStringLength(&ticketPtr->sid)-3;
bsid = (int *) radix64decode_noslash(DStringValue(&ticketPtr->sid)+3, i, &i)
if ((bsid == NULL) || (i != 12)) goto rtn_exit;

fix_endian(&bsid[0], ecp, eda);
fix_endian(&bsid[1], ecp, eda);
fix_endian(&bsid[2], ecp, eda);

/* check the SID version field */
if (get_sid(rev_lw,rev_pos,rev_mask) != sid_rev_zero) goto sid_bad;
if (get_sid(rsrv1_lw,rsrv1_pos,rsrv1_mask) != 0) goto sid_bad;
if (get_sid(rsrv2_lw,rsrv2_pos,rsrv2_mask) != 0) goto sid_bad;

/* Get a pointer to the secret */
secret = GetSecret(get_sid(kid_lw,kid_pos,kid_mask));
if (secret == NULL) goto sid_bad;

/* hash the sid and check the signature */
DStringAppend(&hash, secret, -1);
```

```
.DStringAppend(&hash, DStringValue(&reqPtr->remoteAddr), -1);
sprintf(temp_str, "%08x%08x", bsid[2],bsid[1]);
DStringAppend(&hash, temp_str, -1);
/* format of the hash string is %s%s%08x%08x", secret,ip_addr,bsid[2],bsid[1 hashP = DStringValue(&hash);
act_hash = compute_ihash(hashP);
while (*hashP != 0) *hashP++ = 0;

fix_endian(&act_hash, ecp, eda);
if (act_hash != get_sid(sig_lw,sig_pos,sig_mask)) goto  sid_bad;

/* is is ok, may be expired, but good enough to id user */
ticketPtr->uid = get_sid(uid_lw,uid_pos,uid_mask);
ticketPtr->uctx = get_sid(uctx_lw,uctx_pos,uctx_mask);

/* do the SID experation processing */
cur_tim = (time(0)>>exp_shft_amt) & exp_mask;
exp_tim = get_sid(exp_lw,exp_pos,exp_mask);
tdif = (exp_tim - cur_tim) & 0xffff;
if (tdif > 0x7fff)
   {
   IncTicketCounter(CountExpSid);
   goto sid_exp;
   }

/* sid is fine, save the sid state, update the url's */
ticketPtr->sidDom = get_sid(dom_lw,dom_pos,dom_mask);
ticketPtr->valid = 1;
sid_ok = 1;
IncTicketCounter(CountValidSid);

sid_bad:
  if (!(sid_ok)) IncTicketCounter(CountInvalidSid);
sid_exp:
  DStringAppend(&ticketPtr->rawUrl, DStringValue(&reqPtr->path), -1);
  DStringTrunc(&reqPtr->path, 0);
  DStringAppend(&reqPtr->path, DStringValue(&ticketPtr->rawUrl)+sidLength, -1)

DStringTrunc(&ticketPtr->rawUrl, 0);
  DStringAppend(&ticketPtr->rawUrl, DStringValue(&reqPtr->url), -1);
  DStringTrunc(&reqPtr->url, 0);
  DStringAppend(&reqPtr->url, DStringValue(&ticketPtr->rawUrl)+sidLength, -1);

rtn_exit:
  DStringFree(&hash);
  if (bsid != NULL) free(bsid);
  return HT_OK;
  }
```

60

```
/*
 *----------------------------------------------------------------
 *
 * freeTicketReqData
 *
 *      This routine frees the storage used by ticket specific request
 *      data.
 *
 * Results:
 *      None.
 *
 * Side effects:
 *      Memory freed.
 *
 *----------------------------------------------------------------
 */
static void freeTicketReqData(void *dataPtr)
    {
    TICKET_Request *ticketPtr = dataPtr;
    DStringFree(&ticketPtr->rawUrl);
    DStringFree(&ticketPtr->sid);
    DStringFree(&ticketPtr->fields);
    DStringFree(&ticketPtr->signature);
    DStringFree(&ticketPtr->ticketIP);
    free(ticketPtr);
    }
```

6/

```
/*
 *------------------------------------------------------------------
 *
 * GetSecret --
 *
 *      Given a binary keyID, returns an ascii secret from the
 *      secrets store.
 *      for untranslatable names, return NULL.
 *
 * Results:
 *      "I've got a secret, now you do too"
 *
 * Side effects:
 *
 *
 *------------------------------------------------------------------
 */ char *GetSecret(int kid)
    {
    HashEntry *entryPtr;

entryPtr = FindHashEntry(&TicketServerData.SecretsKid, (void *) kid);
    if(entryPtr == NULL) return NULL;
    return DStringValue((DString *)GetHashValue(entryPtr));
    }
```

– 62 –

```
/*
 *-----------------------------------------------------------------
 *
 * GetKidByKeyID --
 *
 *      Given an ascii  KeyID return the binary KeyID.
 *      for untranslatable names, return -1.
 *
 * Results:
 *      "I've got a secret, now you do too"
 *
 * Side effects:
 *
 *
 *-----------------------------------------------------------------
 */ int GetKidByKeyID(char *keyID)
    {
    HashEntry *entryPtr;

entryPtr = FindHashEntry(&TicketServerData.KeyID, (void *) keyID);
    if(entryPtr == NULL) return -1;
    return (int) GetHashValue(entryPtr);
    }
```

```
/*
 *------------------------------------------------------------
 *
 * fieldParse --
 *
 *  Given a string, a separator character, extracts a field up to the
 *  separator into the result string.
 *  Does substitution on '%XX' sequences, and returns the pointer to the
 *  character beyond last character in '*endptr'.
 *
 * Results:
 *      Returns a malloc'ed string (caller must free), or NULL if an
 *      error occurred during processing (such as an invalid '%' sequence).
 *
 * Side effects:
 *      None.
 *
 *------------------------------------------------------------
 */
#define SIZE_INC 200
static char *fieldParse(char *str, char sep, char **endptr)
{
    char buf[3];
    char c;
    char *end, *data, *p;
    int maxlen, len;

len = 0;
    maxlen = SIZE_INC;
    p = data = malloc(maxlen);

/*
     * Loop through string, until end of string or sep character.
     */
    while(*str && *str != sep) { if(*str == '%') {
            if(!isxdigit(str[1]) || !isxdigit(str[2])) {
                free(data);
                return NULL;
            }
            buf[0] = str[1];
            buf[1] = str[2];
            buf[2] = '\0';
            c = strtol(buf, &end, 16);
            str += 3;
        } else if(*str == '+') {
            c = ' ';
            str++;
        } else
            c = *str++;

*p++ = c;
        len++;
        if(len >= maxlen) {
            maxlen += SIZE_INC;
            data = realloc(data, maxlen);
            p = data + len;
        }
```

64

```
    }
    *p++ = '\0';
    *endptr = str;
    return data;
}
```

```
/*
 *-----------------------------------------------------------------
 *
 * DomainNameCmd --
 *
 *      A call to this routine, builds the ascii domain name
 *      to binary domain name maping structure for a numeric domain.
 *      Syntax is Domain number name1 name2 name3 name... name_last
 *      At least one name is required. The number is decimal and
 *      can be any value except -1. -1 is reserved as a marker
 *      for untranslatable names.
 *
 * Results:
 *      None.
 *
 * Side effects:
 *      Commands are validate, and entries added to the map
 *
 *-----------------------------------------------------------------
 */
static int DomainNameCmd(ClientData clientData, Tcl_Interp *interp,
                         int argc, char **argv)
    {
    int new,i;
    HashEntry *entryPtr;
    int DomNumber;
    DString DomName;

if (argc <3)
       {
       Tcl_AppendResult(interp, argv[0], " directive:   wrong number of "
                "arguments, should be \"3\"",
                (char *) NULL);
       return TCL_ERROR;
       }

DStringInit(&DomName);

if (((sscanf(argv[1], "%d", &DomNumber) != 1) || (DomNumber == -1)))
       {
       Tcl_AppendResult(interp, argv[0], " directive:   ",
                "Domain number must be an integer, and not equal to -1",
                ", value found was ",argv[1],
                (char *) NULL);
       return TCL_ERROR;
       } for (i = 2; i < argc; i++)
       {
       DStringFree(&DomName);
       DStringAppend(&DomName, argv[i], -1);
       strtolower(DStringValue(&DomName));
       entryPtr = CreateHashEntry(&TicketServerData.Domains, DStringValue(&DomNam
       if (new == 0)
          {
          Tcl_AppendResult(interp, argv[0], " directive:   ",
```

```
                "Duplicate domain name specified, '", argv[i], "'",
                (char *) NULL);
        return TCL_ERROR;
        }
    SetHashValue(entryPtr, DomNumber);
    }
DStringFree(&DomName);
return TCL_OK;
}
```

67

```c
/*
 *-----------------------------------------------------------------
 *
 * SecretsCmd --
 *
 *      A call to this routine, builds kid to secrets table
 *
 * Results:
 *      None.
 *
 * Side effects:
 *      Secrets are stored.
 *
 *-----------------------------------------------------------------
 */
static int SecretsCmd(ClientData clientData, Tcl_Interp *interp,
                      int argc, char **argv)
    {
    int newKid,newKeyID;
    HashEntry *entryPtrKid = NULL , *entryPtrKeyID = NULL;
    int Kid;
    DString *dsptrKid;

if (argc != 4)
       {
       Tcl_AppendResult(interp, argv[0], " directive:  wrong number of "
                   "arguments, should be \"4\"",
                   (char *) NULL);
       return TCL_ERROR;
       } if (sscanf(argv[2], "%d", &Kid) != 1)
       {
       Tcl_AppendResult(interp, argv[0],
                   " directive:  KeyID must be an integer",
                   ", value found was '",argv[2],"'",
                   (char *) NULL);
       return TCL_ERROR;
       } entryPtrKid = CreateHashEntry(&TicketServerData.SecretsKid, (void *) Kid, &n
    if (strlen(argv[1]))
       entryPtrKeyID = CreateHashEntry(&TicketServerData.KeyID, (void *) argv[1],
    if ((newKid == 0) || ((newKeyID == 0) && strlen(argv[1])))
       {
       Tcl_AppendResult(interp, argv[0],
                   " directive:  Duplicate Secret specified for KeyID '",
                   argv[1],
                   (char *) NULL);
       return TCL_ERROR;
       } if (strlen(argv[1]))
       {
       dsptrKid = (DString *) malloc(sizeof(DString));
       DStringInit(dsptrKid);
       DStringAppend(dsptrKid, argv[3], -1);
```

68

```
    SetHashValue(entryPtrKid, dsptrKid);
    }

SetHashValue(entryPtrKeyID, Kid);
return TCL_OK;
}
```

```
/*
 *----------------------------------------------------------------
 *
 * TICKET_Initialize --
 *
 *      Calls all the necessary routines to initialize the ticket subsystem.
 *
 * Results:
 *      None.
 *
 * Side effects:
 *      Commands added to the region interpreter.
 *      SID "/@@" url catcher declared.
 *
 *----------------------------------------------------------------
 */ int TICKET_Initialize(HTTP_Server *serverPtr, Tcl_Interp *interp)
{
    TicketServerData.ticketExtensionId = HT_RegisterExtension(serverPtr, "ticket InitHashTable(&TicketServerData.SecretsKid, TCL_ONE_WORD_KEYS);
    InitHashTable(&TicketServerData.KeyID,      TCL_STRING_KEYS);
    InitHashTable(&TicketServerData.Domains,    TCL_STRING_KEYS);

/* initialize Server ticket data */
    DStringInit(&TicketGlobalData(AuthServer));
    DStringInit(&TicketGlobalData(TicketExpHandler));
    DStringInit(&TicketGlobalData(TicketAdrHandler));
    TicketGlobalData(FreeArea)          = 0;
    TicketGlobalData(EnableLocalAuth)   = 0;
    TicketGlobalData(CurrentSecret)     = 0;
    TicketGlobalData(EnableSid)         = 0;
    TicketGlobalData(EnableTicket)      = 0;
    TicketGlobalData(EnableSidEater)    = 0;
    TicketGlobalData(LocalAuthExp)      = 60*30;

/* ticket event counters */
    TicketGlobalData(CountTotalUrl)       = 0;
    TicketGlobalData(CountSidUrl)         = 0;
    TicketGlobalData(CountValidSid)       = 0;
    TicketGlobalData(CountExpSid)         = 0;
    TicketGlobalData(CountInvalidSid)     = 0;
    TicketGlobalData(CountCrossDomain)    = 0;
    TicketGlobalData(CountLocalRedirects) = 0;
    TicketGlobalData(CountRemoteRedirects)= 0;
    TicketGlobalData(CountNoRedirects)    = 0;
    TicketGlobalData(CountDiscardedSidUrl)= 0;

/* Ticket related Config commands */
    Tcl_CreateCommand(interp, "Domain",                 DomainNameCmd,
                (ClientData) serverPtr, NULL);
    Tcl_CreateCommand(interp, "Secrets",                SecretsCmd,
                (ClientData) serverPtr, NULL);
    Tcl_CreateCommand(interp, "AuthenticationServer", CmdStringValue,
                (ClientData) &TicketGlobalData(AuthServer), NULL);
    Tcl_CreateCommand(interp, "TicketExpirationHandler", CmdStringValue,
                (ClientData) &TicketGlobalData(TicketExpHandler), NULL);
```

*70*

```
Tcl_CreateCommand(interp, "TicketAddressHandler", CmdStringValue,
        (ClientData) &TicketGlobalData(TicketAdrHandler), NULL);
Tcl_CreateCommand(interp, "FreeDomain",            CmdIntValue,
        (ClientData) &TicketGlobalData(FreeArea), NULL);
Tcl_CreateCommand(interp, "EnableSidEater",        CmdIntValue,
        (ClientData) &TicketGlobalData(EnableSidEater), NULL);
Tcl_CreateCommand(interp, "EnableSid",             CmdIntValue,
        (ClientData) &TicketGlobalData(EnableSid), NULL);
Tcl_CreateCommand(interp, "EnableTicket",          CmdIntValue,
        (ClientData) &TicketGlobalData(EnableTicket), NULL);
Tcl_CreateCommand(interp, "EnableLocalAuth",       CmdIntValue,
        (ClientData) &TicketGlobalData(EnableLocalAuth), NULL);
Tcl_CreateCommand(interp, "CurrentSecret",         CmdIntValue,
        (ClientData) &TicketGlobalData(CurrentSecret), NULL);
Tcl_CreateCommand(interp, "LocalAuthExp",          CmdIntValue,
        (ClientData) &TicketGlobalData(LocalAuthExp), NULL);

HT_AddMountHandler(serverPtr, (ClientData) NULL, TICKET_DebugHooks,
    "/omiserver", NULL);

return HT_OK;
}
```

```
/*
 *----------------------------------------------------------------------
 *
 * TICKET_Shutdown --
 *
 *      Calls all the necessary routines to shutdown the ticket subsystem.
 *
 * Results:
 *      None.
 *
 * Side effects:
 *      Memory freed
 *
 *----------------------------------------------------------------------
 */
void TICKET_Shutdown(HTTP_Server *serverPtr)
    {
    HashEntry *entryPtr;
    HashSearch search;
    DString   *dstring;

DStringFree(&TicketGlobalData(AuthServer));
    DStringFree(&TicketGlobalData(TicketExpHandler));
    DStringFree(&TicketGlobalData(TicketAdrHandler));

entryPtr = FirstHashEntry(&TicketServerData.SecretsKid, &search);
    while (entryPtr != NULL)
       {
       dstring = GetHashValue(entryPtr);
       DStringFree(dstring);
       free(dstring);
       entryPtr = NextHashEntry(&search);
       }
    DeleteHashTable(&TicketServerData.SecretsKid);

DeleteHashTable(&TicketServerData.KeyID);

DeleteHashTable(&TicketServerData.Domains);
    }
```

72

```
/*
 *----------------------------------------------------------------------
 *
 * TICKET_AddRegionCommands --
 *
 *      Add TICKET region commands for authentication/authorization decisions.
 *
 * Results:
 *      None.
 *
 * Side effects:
 *      Commands added to the region interpreter.
 *
 *----------------------------------------------------------------------
 */
void TICKET_AddRegionCommands(HTTP_Request *reqPtr, Tcl_Interp *interp)
    {
    Tcl_CreateCommand(interp, "RequireSID", TICKET_RequireSidCmd,
                    (ClientData) reqPtr, NULL);
    Tcl_CreateCommand(interp, "RequireTicket", TICKET_RequireTicketCmd,
                    (ClientData) reqPtr, NULL);
    }
```

```
/*
 *-----------------------------------------------------------
 *
 * TICKET_GetCGIVariables --
 *
 *      Add TICKET CGI variables to the CGI variable table.
 *
 * Results:
 *      None.
 *
 * Side effects:
 *      Extends the CGI variable hash table.
 *
 *-----------------------------------------------------------
 */
void TICKET_GetCGIVariables(HTTP_Request *req)
    {
    TICKET_Request *ticketPtr = (TICKET_Request *) HT_GetReqExtData(req, TicketS /*
     * If there's no extension data, then we're not doing a ticket.  Just return
     */ if (ticketPtr == NULL)
        return;

if (DStringLength(&ticketPtr->rawUrl) != 0)
        HT_AddCGIParameter(req, "TICKET_URL", DStringValue(&ticketPtr->rawUrl), FA
    if (DStringLength(&ticketPtr->sid) != 0)
        HT_AddCGIParameter(req, "TICKET_SID", DStringValue(&ticketPtr->sid), FALSE
    if (DStringLength(&ticketPtr->fields) != 0)
        HT_AddCGIParameter(req, "TICKET_FIELDS", DStringValue(&ticketPtr->fields),
    if (DStringLength(&ticketPtr->signature) != 0)
        HT_AddCGIParameter(req, "TICKET_SIGNATURE", DStringValue(&ticketPtr->signa
    }
```

74

```
/*
 *-----------------------------------------------------------------
 *
 * TICKET_GetUrl
 *
 *      Return the original url (with sid)
 *
 * Results:
 *      The URL.
 *
 * Side effects:
 *      None.
 *
 *-----------------------------------------------------------------
 */
char * TICKET_GetUrl(HTTP_Request *reqPtr)
    {

TICKET_Request *ticketPtr;

ticketPtr = (TICKET_Request *)
      HT_GetReqExtData(reqPtr, TicketServerData.ticketExtensionId);
    if ((ticketPtr != NULL) &&
        (DStringLength(&ticketPtr->rawUrl) != 0))
      return DStringValue(&ticketPtr->rawUrl);
    else
      return DStringValue(&reqPtr->url);
    }
```

75

```c
/*
 *---------------------------------------------------------------
 *
 * TICKET_ConfigCheck
 *
 *      Perform late configuration checks
 *
 * Results:
 *
 *
 * Side effects:
 *      Possible message loged/printed, and program exit'd.
 *
 *---------------------------------------------------------------
 */
void TICKET_ConfigCheck()
{
    HashEntry *entryPtr;
    int kid;

if ((TicketGlobalData(EnableSid) & ~0x1) != 0)
       {
       LogMessage(LOG_ERR, "EnableSid must be 0 or 1");
       exit(0);
       } if (!(TicketGlobalData(EnableSid))) return;

kid = TicketGlobalData(CurrentSecret);
    if ((kid && kid_mask) != kid)
       {
       LogMessage(LOG_ERR, "CurrentSecret %d is invalid", kid);
       exit(0);
       } entryPtr = FindHashEntry(&TicketServerData.SecretsKid, (void *) kid);
    if(entryPtr == NULL)
       {
       LogMessage(LOG_ERR, "No secret defined for CurrentSecret %d", kid);
       exit(0);
       } if ((TicketGlobalData(FreeArea) & ~0x255) != 0)
       {
       LogMessage(LOG_ERR, "FreeArea must be between 0 and 255");
       exit(0);
       } if ((TicketGlobalData(EnableSidEater) & ~0x1) != 0)
       {
       LogMessage(LOG_ERR, "EnableSidEater must be 0 or 1");
       exit(0);
       } if ((TicketGlobalData(EnableTicket) & ~0x1) != 0)
       {
       LogMessage(LOG_ERR, "EnableTicket must be 0 or 1");
       exit(0);
       }
```

```
                                    76
if ((TicketGlobalData(EnableLocalAuth) & ~0x1) != 0)
  {
  LogMessage(LOG_ERR, "EnablLocalAuth must be 0 or 1");
  exit(0);
  }
}
```

77

```c
/*
 *------------------------------------------------------------
 *
 * TICKET_DebugHooks
 *
 *      Check for debug hooks and execute if found.
 *
 * Results:
 *      None.
 *
 * Side effects:
 *      None.
 *
 *------------------------------------------------------------
 */
static void TICKET_DebugHooks(ClientData clientData, char *suffix,
                              HTTP_Request *reqPtr)
{
    if(strcmp(suffix, "/ticketstatus") == 0)
    {
      DumpStatus(reqPtr);
      HT_FinishRequest(reqPtr);
      return;
    }
    HTTP_Error(reqPtr, NOT_FOUND, "access denied due to poorly formed url");
    HT_FinishRequest(reqPtr);
    return;
}
```

```
/*
 *----------------------------------------------------------------
 *
 * DumpStatus --
 *
 *      Dump the server's ticket stat's
 *
 * Results:
 *      None.
 *
 * Side effects:
 *      None.
 *
 *----------------------------------------------------------------
 */
#define BUFSIZE 1024
static void DumpStatus(HTTP_Request *reqPtr)
{
    HTTP_Server *serverPtr = reqPtr->serverPtr;
    char tmp[BUFSIZE], timeStr[BUFSIZE];
    struct utsname sysinfo;
    time_t uptime;
    int hours;

HTTP_BeginHeader(reqPtr, "200 OK");
    HTTP_SendHeader(reqPtr, "Content-type: text/html", NULL);
    HTTP_EndHeader(reqPtr);
    HTTP_Send(reqPtr, "<title>WebServer Ticket Status</title>",
                      "<h1>WebServer Ticket Status</h1>", NULL);

HTTP_Send(reqPtr, "<p><hr><p><h2>Ticket Log</h2>","<p><pre>\n", NULL);

sprintf(tmp, "    <b>%s:   </b>    %d\n", "Number of access         ", Ticket
    HTTP_Send(reqPtr, tmp, NULL);
    sprintf(tmp, "    <b>%s:   </b>    %d\n", "Number of SID URL's      ", Ticket
    HTTP_Send(reqPtr, tmp, NULL);
    sprintf(tmp, "    <b>%s:   </b>    %d\n", "Number of Valid SID's    ", Ticket
    HTTP_Send(reqPtr, tmp, NULL);
    sprintf(tmp, "    <b>%s:   </b>    %d\n", "Number of Expired SID's  ", Ticket
    HTTP_Send(reqPtr, tmp, NULL);
    sprintf(tmp, "    <b>%s:   </b>    %d\n", "Number of Invalid SID's  ", Ticket
    HTTP_Send(reqPtr, tmp, NULL);
    sprintf(tmp, "    <b>%s:   </b>    %d\n", "Number of XDomain accesses", Ticket
    HTTP_Send(reqPtr, tmp, NULL);
    sprintf(tmp, "    <b>%s:   </b>    %d\n", "Number of Local Redirects ", Ticket
    HTTP_Send(reqPtr, tmp, NULL);
    sprintf(tmp, "    <b>%s:   </b>    %d\n", "Number of Remote Redirects", Ticket
    HTTP_Send(reqPtr, tmp, NULL);
    sprintf(tmp, "    <b>%s:   </b>    %d\n", "Number of No Auth servers ", Ticket HTTP_Send(reqPtr, tmp, "</pre>", NULL);

uptime = time(NULL) - serverPtr->started;
    uname(&sysinfo);
    strftime(timeStr, BUFSIZE, "%A, %d-%b-%y %T",
        localtime(&serverPtr->started));
```

```
    sprintf(tmp, "Server running on <b>%s</b> (%s %s) port %d, has been up \
            since %s.<p>", sysinfo.nodename, sysinfo.sysname,
            sysinfo.release, serverPtr->server_port, timeStr);
    HTTP_Send(reqPtr, tmp, NULL);

sprintf(tmp, "    <b>Number of connections:    </b> %d\n",
            serverPtr->numConnects);
    HTTP_Send(reqPtr, "<p><pre>\n", tmp, NULL);

sprintf(tmp, "    <b>Number of HTTP requests:   </b> %d\n",
            serverPtr->numRequests);
    HTTP_Send(reqPtr, tmp, "</pre><p>", NULL);

hours = max(uptime / 3600, 1);
    sprintf(tmp, "This server is averaging <b>%d</b> requests per hour.<p>",
            serverPtr->numRequests/hours);
    HTTP_Send(reqPtr, tmp, NULL);

DumpRusage(reqPtr);
/*  DumpConnections(reqPtr); */

DNS_DumpStats(reqPtr);

HTTP_Send(reqPtr, "<p><hr><address>", DStringValue(&ht_serverSoftware),
            "</address>\n", NULL);

reqPtr->done = TRUE;

}
#undef BUFSIZE
```

80

```
User: morris
Host: uprism.openmarket.com
Class: uprism.openmarket.com
Job: t.t
```

What is claimed is:

1. A method of processing service requests from a client to a server system through a network, said method comprising the steps of:
   forwarding a service request from the client to the server system, wherein communications between the client and server system are according to hypertext transfer protocol;
   returning a session identifier from the server system to the client; and
   appending as part of a path name in a uniform resource locator the session identifier to the request and to subsequent service requests from the client to the server system within a session of requests.

2. A method as claimed in claim 1 wherein the session identifier includes a user identifier.

3. A method as claimed in claim 1 wherein the session identifier includes an expiration time for the session.

4. A method as claimed in claim 1 wherein the server system records information from the session identifier in a transaction log in the server system.

5. A method as claimed in claim 4 wherein the server system tracks the access history of sequences of service requests within a session of requests.

6. A method as claimed in claim 5 wherein the server system tracks the access history to determine service requests leading to a purchase made within the session of requests.

7. A method as claimed in claim 4 wherein the server system counts requests to particular services exclusive of repeated requests from a common client.

8. A method as claimed in claim 4 wherein the server system maintains a data base relating customer information to access patterns.

9. A method as claimed in claim 8 wherein the information includes customer demographics.

10. A method as claimed in claim 1 wherein the server system assigns the session identifier to an initial service request to the server system.

11. A method as claimed in claim 1 wherein the server system subjects the client to an authorization routine prior to issuing the session identifier and the session identifier is protected from forgery.

12. A method as claimed in claim 1 wherein the server system comprises plural servers including an authentication server which provides session identifiers for service requests to multiple servers.

13. A method as claimed in claim 12 wherein:
   a client directs a service request to a first server which is to provide the requested service;
   the first server checks the service request for a session identifier and only services a service request having a valid session identifier, and where the service request has no valid identifier:
      the first server redirects the service request from the client to the authorization server;
      the authorization server subjects the client to the authorization routine and issues the session identifier to be appended to the service request to the first server;
      the client forwards the service request appended with the session identifier to the first server; and
      the first server recognizes the session identifier and services the service request to the client; and
   the client appends the session identifier to subsequent service requests to the server system and is serviced without further authorization.

14. A method as claimed in claim 13 wherein the session identifier includes a user identifier.

15. A method as claimed in claim 13 wherein the session identifier includes an expiration time for the session.

16. A method as claimed in claim 13 wherein the session identifier provides access to a protected domain to which the session has access authorization.

17. A method as claimed in claim 16 wherein the session identifier is modified for access to a different protected domain.

18. A method as claimed in claim 13 wherein the session identifier provides a key identifier for key management.

19. A method as claimed in claim 13 wherein the server system records information from the session identifier in a transaction log in the server system.

20. A method as claimed in claim 13 wherein the client modifies the path name of a current uniform resource locator using relative addressing and retains the session identifier portion of the path name unmodified for successive requests in the session.

21. A method as claimed in claim 1 wherein:
   the server system subjects the client to an authorization routine prior to issuing the session identifier and the session identifier is protected from forgery, records information from the session identifier in a transaction log in the server system, tracks request paths relative to hypertext pages, and maintains a data base relating customer demographics to access patterns; and
   the client modifies the path name of a current uniform resource locator using relative addressing and retains the session identifier portion of the path name unmodified for successive requests in a session.

22. A method of processing service requests from a client to a server system through a network, said method comprising the steps of:
   appending as part of a path name in a uniform resource locator a session identifier to the request, wherein communications between the client and server system are according to hypertext transfer protocol;
   responding to requests for hypertext pages received from a client through the network by returning the requested hypertext pages to the client;
   responding to further client requests related to links in the hypertext pages; and tracking the further client requests related to a particular hypertext page.

23. A method as claimed in claim 22 wherein the requests include a common session identifier and the server system tracks client requests within a session of requests.

24. A method of processing service requests from a client to a server system through a network, said method comprising the steps of:
   appending a session identifier to the request as part of a path name in a uniform resource locator, wherein communications between the client and server system are according to hypertext transfer protocol; and
   responding to requests for documents received from the client through the network by returning the requested documents wherein the documents are customized for a particular user based on a user profile.

25. A method of processing service requests from a client to a server system through a network, said method comprising the steps of:
   responding to a request for a document received from the client through the network, wherein communications between the client and server system are according to hypertext transfer protocol;

appending a session identifier, which includes a user identification to the request as part of a path name in a uniform resource locator; and returning the requested document wherein the document is customized for a particular user based on the user identification of the session identifier.

26. A method of processing service requests from a client to a server system through a network, said method comprising the steps of:

appending a session identifier to the request as part of a path name in a uniform resource locator, wherein communications between the client and server system are according to hypertext transfer protocol;

responding to requests for information received from the client through the network by returning the requested information to the client; and counting requests to particular information exclusive of repeated requests from a common client.

27. A method as claimed in claim 26 comprising excluding from the counting requests made for information from the client within a defined period of time.

28. A method of processing service requests for a document received from a client through a network in which the document has been purchased by a user, said method comprising the steps of:

responding to a request for a document received from a client through the network in which the document has been purchased by the user wherein communications between the client and server system are according to hypertext transfer protocol;

appending an authorization identifier to the request as part of a path name in a uniform resource locator; and returning the requested document if the authorization identifier indicates that the user is authorized to access the document.

29. A method as claimed in claim 28, wherein the authorization identifier is encoded within a session identifier which is appended to the request as part of a path name in a uniform resource locator.

30. A method of processing service requests from a client to a server system through a network, said method comprising the steps of:

responding to a request for a document received from a client through the network, wherein communications between the client and server system are according to hypertext transfer protocol;

appending as part of a path name in a uniform resource locator a session identifier to the request;

returning the requested document to the client, and;

charging the user identified in the session identifier for access to the document.

31. A method as claimed in claim 30, wherein a user identifier is encoded within a session identifier which is appended to the request.

32. An information system on a network, comprising:

means for receiving service requests from clients and for determining whether a service request includes a session identifier, wherein communications between the client and server system are according to hypertext transfer protocol;

means for appending the session identifier as part of a path name in a uniform resource locator in response to an initial service request in a session of requests; and means for servicing service requests from a client which include the session identifier, the subsequent service request being processed in the session.

33. An information system as claimed in claim 32 wherein the means for providing the session identifier is in a server system which services the requests.

34. An information system as claimed in claim 32 further comprising an authorization routine for authorizing the client prior to issuing the session identifier and means for protecting the session identifier from forgery.

35. An information server system as claimed in claim 32 further comprising a transaction log for recording information from the session identifier.

36. An information system as claimed in claim 32 further comprising means for tracking access history of sequences of service requests within the session of requests.

37. An information system as claimed in claim 32 further comprising means for counting requests to particular services exclusive of repeated requests from a common client.

38. An information system as claimed in claim 32 further comprising a data base relating customer information to access patterns.

39. An information system as claimed in claim 38 wherein the information includes customer demographics.

40. An information server on a network, comprising:

means for appending a session identifier as part of a path name in a uniform resource locator, wherein communications between the client and server system are according to hypertext transfer protocol;

means for responding to requests for hypertext pages received from a client through the network by returning the requested hypertext pages to the client;

means for responding to further requests derived from links in the hypertext pages; and means for tracking the further requests derived from a particular hypertext page.

41. A server as claimed in claim 40 wherein the requests include a common session identifier and the server tracks requests within a session of requests.

42. A server as claimed in claim 41 further comprising a data base relating customer demographics to access patterns.

43. An information server on a network, comprising:

means for appending the session identifier as part of a path name in a uniform resource locator, wherein communications between the client and server system are according to hypertext transfer protocol;

means for responding to requests for service received from a client through a network by returning the requested service to the client; and means for counting requests to particular service exclusive of repeated requests from a common client.

44. A server as claimed in claim 43 wherein the requests include a common session identifier and the server tracks requests within a session of requests.

45. A server as claimed in claim 43 further comprising means for excluding requests made to a service from the client within a defined period of time.

* * * * *

(12) EX PARTE REEXAMINATION CERTIFICATE (5320th)
United States Patent
Levergood et al.

(10) Number: US 5,708,780 C1
(45) Certificate Issued: Apr. 4, 2006

(54) INTERNET SERVER ACCESS CONTROL AND MONITORING SYSTEMS

(75) Inventors: Thomas Mark Levergood, Hopkinton, MA (US); Lawrence C. Stewart, Burlington, MA (US); Stephen Jeffrey Morris, Westford, MA (US); Andrew C. Payne, Lincoln, MA (US); George Winfield Treese, Newton, MA (US)

(73) Assignee: Divine Technology Ventures, Chicago, IL (US)

Reexamination Request:
No. 90/007,183, Aug. 24, 2004

Reexamination Certificate for:
Patent No.: 5,708,780
Issued: Jan. 13, 1998
Appl. No.: 08/474,096
Filed: Jun. 7, 1995

(51) Int. Cl.
*G06F 15/16* (2006.01)
*G06F 15/56* (2006.01)

(52) U.S. Cl. ............... 709/229; 709/203; 709/218; 709/219; 709/228

(58) Field of Classification Search ........... 709/203, 709/208, 217–219, 224–225, 227–229
See application file for complete search history.

(56) References Cited

U.S. PATENT DOCUMENTS

| 4,305,059 A | 12/1981 | Benton |
| 4,484,304 A | 11/1984 | Anderson et al. |
| 4,528,643 A | 7/1985 | Freeny, Jr. |

(Continued)

FOREIGN PATENT DOCUMENTS

| EP | 0172 670 | 2/1986 |
| EP | 0456920 | 11/1991 |
| EP | 0542 298 | 5/1993 |
| EP | 0542298 B1 | 5/1993 |
| EP | 0645688 | 3/1995 |
| GB | 2102606 | 2/1983 |
| JP | 4-10191 | 1/1992 |
| JP | 05-158983 | 6/1993 |
| WO | WO 91/16691 | 10/1991 |
| WO | WO 93/10503 | 5/1993 |
| WO | WO 94/03859 | 2/1994 |
| WO | WO 95/16971 | 6/1995 |

OTHER PUBLICATIONS

Trewitt Glenn, *Using Tcl to Process HTML Forms*, Digital Equipment Corporation Network Systems Laboratory TN–14, dated Mar. 1994.

Derler, Christian, *The World–Wide Web Gateway to Hyper–G: Using a Connectionless Protocol to Access Session–Oriented Services*, Institut für Informationsverarbeitung und Computergestützte neue Medien, Graz, Austria, dated Mar. 1995.

Hall, Devra, et al, *Build a Web Site: The Programmer's Guide to Creating, Building, and Maintaining a Web Presence*, published Apr. 1995. ISBN 0–7615–0064–2.

The NetMarket Company, *NetMarket PGP Help* file, from netmarket.com, dated Dec. 10, 1994.

(Continued)

*Primary Examiner*—Bharat Barot

(57) ABSTRACT

This invention relates to methods for controlling and monitoring access to network servers. In particular, the process described in the invention includes client-server sessions over the Internet involving hypertext files. In the hypertext environment, a client views a document transmitted by a content server with a standard program known as the browser. Each hypertext document or page contains links to other hypertext pages which the user may select to traverse. When the user selects a link that is directed to an access-controlled file, the server subjects the request to a secondary server which determines whether the client has an authorization or valid account. Upon such verification, the user is provided with a session identification which allows the user to access to the requested file as well as any other files within the present protection domain.

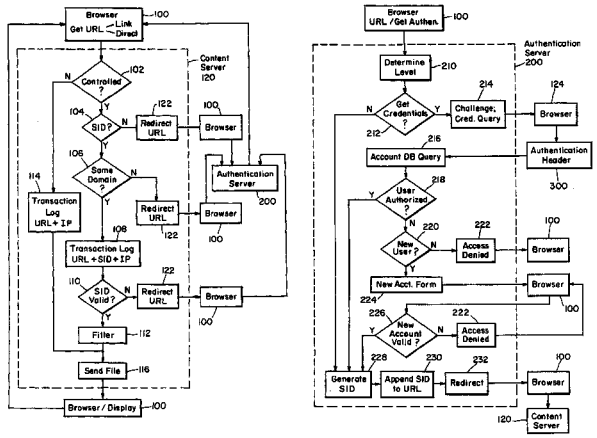

U.S. PATENT DOCUMENTS

| | | |
|---|---|---|
| 4,529,870 A | 7/1985 | Chaum |
| 4,566,078 A | 1/1986 | Crabtree |
| 4,578,530 A | 3/1986 | Zeidler |
| 4,734,858 A | 3/1988 | Schlafly |
| 4,755,940 A | 7/1988 | Brachtl et al. |
| 4,759,063 A | 7/1988 | Chaum |
| 4,759,064 A | 7/1988 | Chaum |
| 4,775,935 A | 10/1988 | Yourick |
| 4,795,890 A | 1/1989 | Goldman |
| 4,799,156 A | 1/1989 | Shavit et al. |
| 4,812,628 A | 3/1989 | Boston et al. |
| 4,827,508 A | 5/1989 | Shear |
| 4,891,503 A | 1/1990 | Jewell |
| 4,922,521 A | 5/1990 | Krikke et al. |
| 4,926,480 A | 5/1990 | Chaum |
| 4,935,870 A | 6/1990 | Burk, Jr. et al. |
| 4,941,089 A | 7/1990 | Fischer |
| 4,947,028 A | 8/1990 | Gorog |
| 4,947,430 A | 8/1990 | Chaum |
| 4,949,380 A | 8/1990 | Chaum |
| 4,972,318 A | 11/1990 | Brown et al. |
| 4,977,595 A | 12/1990 | Ohta et al. |
| 4,982,346 A | 1/1991 | Girouard et al. |
| 4,987,593 A | 1/1991 | Chaum |
| 4,991,210 A | 2/1991 | Chaum |
| 4,992,940 A | 2/1991 | Dworkin |
| 4,996,711 A | 2/1991 | Chaum |
| 5,025,373 A | 6/1991 | Keyser, Jr. et al. |
| 5,035,515 A | 7/1991 | Crossman et al. |
| 5,060,153 A | 10/1991 | Nakagawa |
| 5,077,607 A | 12/1991 | Johnson et al. |
| 5,105,184 A | 4/1992 | Pirani et al. |
| 5,204,947 A | 4/1993 | Bernstein et al. |
| 5,220,501 A | 6/1993 | Lawlor et al. |
| 5,247,575 A | 9/1993 | Sprague et al. |
| 5,276,736 A | 1/1994 | Chaum |
| 5,297,249 A | 3/1994 | Bernstein et al. |
| 5,305,195 A | 4/1994 | Murphy |
| 5,309,437 A | 5/1994 | Perlman et al. |
| 5,311,594 A | 5/1994 | Penzias |
| 5,319,542 A | 6/1994 | King, Jr. et al. |
| 5,321,751 A | 6/1994 | Ray et al. |
| 5,325,362 A | 6/1994 | Aziz |
| 5,336,870 A | 8/1994 | Hughes et al. |
| 5,341,429 A | 8/1994 | Stringer et al. |
| 5,347,632 A | 9/1994 | Filepp et al. |
| 5,351,186 A | 9/1994 | Bullock et al. |
| 5,351,293 A | 9/1994 | Michener et al. |
| 5,353,283 A | 10/1994 | Tsuchiya |
| 5,383,113 A | 1/1995 | Kight et al. |
| 5,388,257 A | 2/1995 | Bauer |
| 5,414,833 A | 5/1995 | Hershey et al. |
| 5,457,738 A | 10/1995 | Sylvan |
| 5,475,585 A | 12/1995 | Bush |
| 5,483,652 A | 1/1996 | Sudama et al. |
| 5,491,820 A | 2/1996 | Belove et al. |
| 5,521,631 A | 5/1996 | Budow et al. |
| 5,530,852 A | 6/1996 | Meske, Jr. et al. |
| 5,535,229 A | 7/1996 | Hain, Jr. et al. |
| 5,544,320 A | 8/1996 | Konrad |
| 5,544,322 A | 8/1996 | Cheng et al. |
| 5,550,984 A | 8/1996 | Gelb |
| 5,557,516 A | 9/1996 | Hogan |
| 5,557,518 A | 9/1996 | Rosen |
| 5,557,798 A | 9/1996 | Skeen et al. |
| 5,560,008 A | 9/1996 | Johnson et al. |
| 5,577,209 A | 11/1996 | Boyle et al. |
| 5,583,996 A | 12/1996 | Tsuchiya |
| 5,590,197 A | 12/1996 | Chen et al. |
| 5,592,378 A | 1/1997 | Cameron et al. |
| 5,594,910 A | 1/1997 | Filepp et al. |
| 5,596,642 A | 1/1997 | Davis et al. |
| 5,596,643 A | 1/1997 | Davis et al. |
| 5,604,802 A | 2/1997 | Holloway |
| 5,619,648 A | 4/1997 | Canale et al. |
| 5,621,797 A | 4/1997 | Rosen |
| 5,623,547 A | 4/1997 | Jones et al. |
| 5,623,656 A | 4/1997 | Lyons |
| 5,642,419 A | 6/1997 | Rosen |
| 5,664,110 A | 9/1997 | Green et al. |
| 5,664,111 A | 9/1997 | Nahan et al. |
| 5,675,507 A | 10/1997 | Bobo, II |
| 5,694,551 A | 12/1997 | Doyle et al. |
| 5,710,884 A | 1/1998 | Dedrick |
| 5,715,314 A | 2/1998 | Payne et al. |
| 5,724,424 A | 3/1998 | Gifford |
| 5,724,521 A | 3/1998 | Dedrick |
| 5,727,164 A | 3/1998 | Kaye et al. |
| 5,732,219 A | 3/1998 | Blummer et al. |
| 5,734,719 A | 3/1998 | Tsevdos et al. |
| 5,761,662 A | 6/1998 | Dasan |
| 5,768,142 A | 6/1998 | Jacobs |
| 5,768,521 A | 6/1998 | Dedrick |
| 5,774,670 A | 6/1998 | Montulli |
| 5,784,565 A | 7/1998 | Lewine |
| 5,790,793 A | 8/1998 | Higley |
| 5,806,077 A | 9/1998 | Wecker |
| 5,812,776 A | 9/1998 | Gifford |
| 5,826,241 A | 10/1998 | Stein et al. |
| 5,826,242 A | 10/1998 | Montulli |
| 5,848,399 A | 12/1998 | Burke |
| 5,848,413 A | 12/1998 | Wolff |
| 5,870,552 A | 2/1999 | Dozier et al. |
| 5,895,454 A | 4/1999 | Harrington |
| 5,897,622 A | 4/1999 | Blinn et al. |
| 5,909,492 A | 6/1999 | Payne et al. |
| 5,920,847 A | 7/1999 | Kolling et al. |
| 5,982,891 A | 11/1999 | Ginter et al. |
| 6,006,199 A | 12/1999 | Berlin et al. |
| 6,023,683 A | 2/2000 | Johnson et al. |
| 6,041,316 A | 3/2000 | Allen |
| 6,049,785 A | 4/2000 | Gifford |
| 6,134,592 A | 10/2000 | Montulli |
| 6,195,649 B1 | 2/2001 | Gifford |
| 6,199,051 B1 | 3/2001 | Gifford |
| 6,205,437 B1 | 3/2001 | Gifford |
| 6,449,599 B1 | 9/2002 | Payne et al. |

OTHER PUBLICATIONS

Aronson, Dan, et al, Electronic Mail to multiple recipients of the www–talk list (talk@info.cern.ch) on "Access and session control" dated Sep. 15, 1994.

English, Joe, Electronic Mail to multiple recipients of the www–talk list (talk@info.cern.ch) on "Re: Identifying Mosaic session" dated Dec. 20, 1994.

Bina, et al., Secure Acces to Data over the Internet, 1994, p. 99–102, IEEE.

"It will happen", article excerpt from infoHighway, vol. 2–1, Jan. 1995.

McCartney, Todd, Message posted to Usenet public discussion group, rec.arts.disney, dated Nov. 21, 1994.

Hughes, Kevin, source code file for the HTTP log file analysis program, getstats v1.0, dated Feb. 1, 1994, published at eit.com/software/getstats/getstats.html.

Fielding, Roy, software distribution archive for the HTTP log file analysis program, wwwstat v1.01, dated Apr. 24, 1994, published at ics.uci.edu/WebSoft/wwwstat/.

Pitkow, et al, *Results from the First World Wide Web Use Survey*, presented at the First International Conference on the World Wide Web, Geneva, Switzerland, May 25–27, 1994, published at 94.web.cern.ch/WWW94/PrelimProcs.html on Jun. 2, 1994, and reprinted in the Journal of Computer Networks and ISDN Systems, vol. 27, No. 2., Nov. 1994, Elsevier Science B.V.

Pitkow, et al, *Using the Web as a Survey Tool: Results from the Second WWW User Survey*, presented at The Third International World–Wide Web Conference, Apr. 10–14, 1995, Darmstadt, Germany, published at igd.fhg.de/archive/1995_www95/proceedings/papers/79/survey/survey_2paper.html and elsevier.nl/www3/welcome.html; and reprinted in the Journal of Computer Networks And ISDN Systems, vol. 27, No. 6, Apr. 1995, Elsevier Science B.V.

Complaint for Patent Infringement filed Jan. 12, 2004.

Amazon.com's Answer, Affirmative Defenses, and Counterclaims to Soverain Software's Complaint filed Mar. 9, 2004.

Amazon.com's Response to Plaintiff's First Set of Interrogatories filed Jun. 11, 2004.

Soverain's Responses and Objections to Amazon.com's First Set of Interrogatories (Nos. 1–14) filed Jun. 11, 2004.

Disclosure of Preliminary Invalidity Contentions by Defendants Amazon.com and the Gap (with Exhibit A) filed Jul. 6, 2004.

Amazon's Motion for Partial Summary Judgment of Non–Infringement ('780 Patent), and Memorandum in Support Thereof filed Jul. 15, 2005.

Soverain's Supplemental Responses to Amazon.com's First Set of Interrogatories (Nos. 1–14) filed Aug. 13, 2004.

Soverain's Second Supplemental Response to Amazon.com's First Set of Interrogatories (Nos. 1–14) filed Sep. 21, 2004.

Soverain's Third Supplemental Response to Amazon.com's First Set of Interrogatories (Nos. 1–14).

Soverain's Opposition to Defendant Amazon.com's Motion for Partial Summary Judgement of Non–Infringement ('780 Patent) and Supporting Memorandum; Declaration of Jack Grimes.

Amazon.com's Reply in Support of its Motion for Partial Summary Judgment of Non–Infringement ('780 Patent) filed Aug. 19, 2004; Declaration of John Vandenberg.

Soverain's Surreply to Amazon.com's Motion for Partial Summary Judgment of Non–Infringement ('780 Patent) filed Aug. 23, 2004 and Supplemental Declaration of Jack D. Grimes Ph.D. filed Aug. 23, 2004.

Soverain's Preliminary Claim Construction (Patent Local Rule 4–2) filed Sep. 2, 2004.

Joint Disclosure of Preliminary Claim Construction and Extrinsic Evidence by Defendants Amazon.com and the Gap (with Exhibits A–B) filed Sep. 2, 2004.

Joint Claim Construction and Prehearing Statement (Patent Local Rule 4–3) (with Exhibits A–D) filed Oct. 4, 2004.

Amazon.com's First Amended Answer, Affirmative Defenses, and Counterclaims to Soverain's Complaint filed Oct. 6, 2004.

Declaration of Jack D. Grimes Ph.D. dated Nov. 15, 2004.

Soverain's Claim Construction Brief Pursuant to Patent Rule 4–5(a) dated Nov. 16, 2004.

Declaration of Dr. Richard N. Taylor in Support of Defendants' Markman Brief dated Nov. 29, 2004.

Joint Claim Construction Brief of Amazon.com and Gap dated Nov. 30, 2004.

Soverain's Claim Construction Reply Brief Pusuant to Patent Rule 4–5(c) dated Dec. 7, 2004.

Bina, E., et al., "Secure Access to Data Over the Internet," 1994 IEEE, pp. 99–102.

Kiuchi, T., et al., "C–HTTP—The Development of a Secure, Closed HTTP–Based Network on the Internet," 1996 IEEE, pp. 64–75.

Berners–Lee, T., et al., "Target a Common Internet Syntax Where the User Password is Appended to a Specific URL," ietf.org/rfc/rfc1738.txt?number=1738.

57 USPQ2D, "*Amazon.com, Inc. v. Barnesandnoble.com, Inc.*" pp. 1746–1763.

Pitkow, J.E., "Webviz: A Tool for World–Wide Web Access Log Analysis." First International World Wide Web Conf., May 1994, 7 pgs.

Lim, Jong–Gyun, "Using Coollists to Index HTML Documents in the Web." ncsa.uiuc.edu/SDG/TT94/Proceedings/Searching/lim/coollist.htm, pp. 1–8.

Sedayao, J., "Mosaic Will Kill My Network!—Studying Network Traffic Patterns of Mosaic Use", ncsa.uiuc.edu/SDG/TT94/P . . . gs/DDay/sedayao/mos_traf_paper.htm.

Catledge, L.D., "Characterizing Browsing Strategies in the World–Wide Web," igd.thg.de/archive/1995_ . . . /UserPatterns.Paper4.formatted.htm.

Menefee, C., "New host for Internet Commercial Site Index," Newsbytes Nov. 9, 1994, p. 15.

Michalski, J., "Content in context: the Future of SGML and HTML," Release 1.0, Sep. 27, 1994, pp 1–10.

Metcalf, R.M., "Commercialization of the Internet Opens Gateways to Interpreneurs," InfoWorld, Aug. 8, 1994, p. 44.

"maX.500–a Macintosh X.500 Directory Client", contents of WWW website, umich.edu/dirsvcs/ldap/max500/index.htlm as of Jul. 7, 1997.

Droms, R.E., "Access to Heterogenous Directory Services," Proceedings IEEE INFOCOM '90, pp. 1054–1061, San Francisco, CA, Jun. 3–7, 1990.

Good, B., "Experience with Bank of America's Distributive Computing System," pp. 2–8, IEEE 1983.

Inselberg, A., "An Approach to Successful Online Transaction Processing Applications," AFIPS Conference Proceedings, 1985 National Computer Conference, pp. 419–427, Chicago, IL, Jul. 15–18, 1985.

Bowman, et al., "Univers: An Attribute–Based Name Server," Software Practice and Experience, vol. 20(4) 403–424 (Apr. 1990).

NCSA HTTPd 1.5 Beta How to Redirect, "The New Redirect Directives."

Housel, B.C., et al., "SNA Distribution Services," IBM Systems Journal, pp. 319–343, vol. 22, No. 4, 1983.

Zatti, et al., "Naming and Registration for IBM Distributed Systems," IBM Systems Journal, pp. 353–380, vol. 31, No. 2, 1992.

Welch, B., et al., "Prefix Tables: A Simple Mechanism for Locating Files in a Distributed System," pp. 184–189, 6th International Conference on Distributed Computing Systems, IEEE Computer Society, Cambridge, MA, May 1996.

Schwartz, et al., "A Name Service for Evolving, Heterogeneous Systems," Proceedings of the 11th ACM Symposium on Operating Systems Principles, vol. 21, No. 5, pp. 52–62, Austin, TX, Nov., 1987.

Hitchens, M., et al., "Bindings Between Names and Objects in a Persistent System," Proceedings of the 2$^{nd}$ International Workshop on Object Orientation in Operating Systems, IEEE Computer Society, pp. 26–37, Dourdan, FR, Sep. 1992.

Sheltzer, et al., "Name Service Locality and Cache Design in a Distributed Operating System," University of California, Los Angeles, 8 pgs.

Andrade, et al., "Open On–Line Transaction Processing with the TUXEDO System," pp. 366–371, Digest of Papers, IEEE Computer Society Press, COMPSON Spring 1992, San Francisco, California.

Terry, D.B., "Structure–free Name Management for Evolving Distributed Environments," pp. 502–508, 6$^{th}$ International Conference on Distributed Computing Systems, IEEE Computer Society, Cambridge, MA, May, 1986.

Cheriton, D.R., et al., "Uniform Access to Distributed Name Interpretation in the V–System," pp. 290–297, 4$^{th}$ International Conference on Distributed Computing System, IEEE Computer Society, San Francisco, CA, May, 1984.

Lampson, B.W., "Designing a Global Name Service,", pp. 1–10, Proceedings of the 5$^{th}$ Annual ACM Symposium on Principles of Distributed Computing, ACM, Calgary, Alberta, Canada, Aug. 1986.

Curtis, R., et al., "Naming in Distributed Language Systems," pp. 298–302, 4$^{th}$ International Conference on Distributed Computing Systems, IEEE Computer Society, San Francisco, CA May 1984.

Squillante, M.C., et al., Integrating Heteregeneous Local Mail Systems, pp. 59–67, IEEE Software, Nov. 1989.

Schwartz, M.F., et al., Experience with a Semantically Cognizant Internet White Pages Directory Tool, Journal of Internetworking: Research and Experience, pp. 1–22 (1990).

Ordille, J.J., et al., "Nomenclater Descriptive Query Optimization for Large X.500 Environments," pp. 185–196, SIGCOM '91 Conference, Communication Architectures & Protocols, vol. 21, No. 4, Zurich, Switzerland, Sep., 1991.

Notkin, D., "Proxies: A Software Structure for Accomodating Hetergeneity," Software–Practice and Experience, vol. 20(4), 357–364, Apr. 1990.

Bjorn N. Freeman–Benson, "Using the Web to Provide Private Information," First International Conference on the World Wide Web, WWW94, May 1994, 5 pages.

Chaum, D., "Achieving Electronic Privacy," Scientific American, Aug. 1992, pp 96–101.

Neuman, B.C., "Proxy–Based Authorization and Accounting for Distributed Systems," Proceedings on the 13$^{th}$ International Conference on Distributed Computing Systems, Pittsburg, May 1993, pp. 283–291.

Anderson, R., "Why Cryptosystems Fail," 1$^{st}$ Conf.—Computer & Comm. Security, 1993–11/93–VA, USA, pp 215–227.

Abadi M., et al., "Authentication and Delegation with Smart–Cards," Oct. 1990, Chapter 67.

Rivest, R., "The MD5 Message–Digest Algorithm," MIT Laboratory for Computer Science and RSA Data Security, Inc., Apr. 1992.

Voydock V., et al., "Security Mechanisms in High Level Network Protocols," Computing Surveys, vol. 15, No. 2, Jun. 1983, pp. 135–171.

Gligor, V.D., "Object Migration and Authentication," IEEE Transactions of Software Engineering, vol. SE–5, No. 6, Nov. 1979, pp. 607–611.

"Mosaic Communications Unveils Network Navigator and Server Software for the Internet," Mosaic Communications Press Release, Sep. 1994.

Rescorla, E., et al., "The Secure HyperTest Transfer Protocol," Aug. 1999.

Lou Montulli, Electronic Mail to Multiple Recipients of the www–talk list (www–talk.1995q2/0134.html on "Session Tracking" (omi.mail.www–talk, Apr. 18, 1995).

Ramanathan, Sirvivas, et al., "Architectures for Personalized Multimedia," IEEE Multimedia, vol. 1, No. 1, Computer Society PP 37–46 1994.

Choudhury, Abhijit K., et al., "Copyright Protection for Electronic Publishing Over Computer Networks," IEEE Network, The Magazine of Computer Communications, vol. 9, No. 3, pp. 12–20, May 1995.

"Persistent Client State HTTP Cookies," search.netscape.com/newsref/std/cookie_spec.html (Jan. 9, 1998).

"HTTP State Management Mechanism," internic.net/rfc/rfc2109.txt (Jan. 9, 1998)—cse.ohio–state.edu/cgi–bin/rfc/rfc2965.html.

Pitkow, J.E., and Recker, M.M., Using the Web as a Survey Tool: Results from Second WWW User Survey,: igd.fhg.de/archive/1995_www95/papers/79/survey/survey_2_paper.html.

Peterson, Larry L., "A Yellow–Pages Service for a Local–Area Network," ACM Proceedings of the ACM SIGCOMM 87 Workshop, ACM Press, 1988, pp. 235–242.

Kahan Jose, "A Distributed Authorization Model for WWW," isoc.org/HMP/PAPER/107/html/paper.html, pp. 1–16.

Kahan, Jose, "A capability–based authorization model for the World–Wide Web," igd.fhg.de/archive/1995_www95/proceedings/papers/86/CaMWWW.htlm, pp. 1–14.

Kahan, Jose, "Un nouveau modele d–autorisation pour les systemes de consultation d–information multimedia repartee," pp. 45–57.

Kahan, Jose, "A New Authorization Model for Distributed Multimedia Information Consultation Systems," English Translation, pp. 1–21.

Berners–Lee, T., et al., ietf.org/rfc/rfc1738.txt?numbers=178.

Gary Welz, "The Media Business on the WWW", Proceedings of the Second World Wide Web Conference 1994: Mosaic and the Web, Oct. 1994, 6 pages.

Clickstream, Oct. 1996, The word Spy, [wordspy.com/words/clickstream.asp], 2 pages.

Bob Novick, (9503) Internet Marketing: The Clickstream, Mar. 1995, [i–m.com/archives/9503/0375.html] 3 pages.

Brian W. Kemighan and Dennis M. Ritchie, "The C Programming Language" second edition, AT&T Bell Laboratories, (N.J., Prentice Hall) pp. 17–21 (1998).

Computer and Business Equipment Manufacturers Association, "American National Standard for Information Systems–Database Language SQL" (N.Y., American National Standards Institute) pp. 27–28 (1986).

Aho, A.V., et al., "Reports and Databases." In the AWK Programming Language, M.A. Harrison, ed., (Addison–Wesley), pp. 100–101 (1988).

Kelley, A., and Pohl, I., "Arrays, Strings, and Pointers." In a Book on C, A. Apt, ed., (the Benjamin/Cummings Publishing Company, Inc.,) pp. 35–37 (1984).

WordPerfect for Macintosh, pp. 153–162 (1990).

Amazon "Welcome First Time Visitors" Jun. 1998 pp 1–4.

"CompuServe Videotex Network Offers Marketing Research Service, ad Test", Marketing News, Nov. 25, 1983, p. 21.

"Electronic In–Home Shopping: 'Our Stores are Always Open'," Chain Store Age Executive, Mar. 1985, pp. 111, 116.

"Mall Offers a Holiday Treat for Hackers," Advertising Age, Nov. 13, 1985, p. 76.

"Suddenly, VideoTax is Finding an Audience", Business Week, Oct. 19, 1987, pp. 92–94.

"Redcoats Join Communications Fight", Industry Week, Feb. 22, 1982, pp. 108–109.

"Taking Advantage of the Past",Advertising Age, Apr. 11, 1983, pp. M36–37.

American National Standard: "Financial Institution Retail Message Authentication"; ANSI X9.19–1986.

American National Standard: "Interchange Message Specification for Debit and Credit Card Message Exchange Among Financial Institutions"; ANSI–X9.2–1988.

Anderson, Ross J.: "UEPS—A Second Generation Electronic Walltet", Proc. of the Second European Symposium on Research in Computer Security (ESORICS); Touluse, France, pp. 411–418, no date.

Bellcore Internal e–mail, Nov. 24, 1993, 7 pages.

Bender, M., "EFTC: Electronic Funds Transfer Systems", Kennikat Press; Port Washington, New York, pp. 43–46; 1975.

Beutelspacher et al., "Payment Applications with Multifunctional Smart Cards", Smart Card 2000, 1989, pp. 95–101.

BizNet Technologies, Versatile Virtual Vending, published by http://www.bnt.com, Sep. 12, 1994.

Booz, Allen & Hamilton, "How to Buy Information with a First Virtual Account", Apr. 11, 1994, 63 pages.

Bos et al., "SmartCash: A Practical Electronic Payment System", Centre for Mathematics and Computer Science, Aug. 1990, pp. 1–8.

Burk et al., "Digital Payment Systems Enabling Security and Unobservability", Computers & Security, 1989, pp. 399–415.

Burk et al., "Value Exchange Systems Enabling Security and Unobservability", Computers & Security, 1990, pp. 715–721.

Chaum et al., "Untraceable Electronic Cash"; Advances in Cryptology, 1988, pp. 319–327.

Chaum et al., "Implementing Capability–Based Protection Using Encryption", Electronics Research Laboratory, University of California, Berkeley, 1978, 12 pages.

Cohen, D., "Computerized Commerce", ISI Reprint Series IS/RS–89–243; Oct. 1989, Reprinted from Information Processing 89, Proceedings of the IFIP World Computer Congress, Held Aug. 28–Sep. 1, 1989, 8 pages.

Cohen, D., "Electronic Commerce", University of Southern California Information Sciences Institute, Research Report ISI/RR–89–244, Oct. 1989, 42 pages.

CompuServe International: CompuServe Information Service Users Guide, pp. 109–113; 1986.

Computer Shopper, "Internet for Profit", Nov. 1994, pp. 180–182; 190–192; 522–528, 532, 534.

"Consumers Plugging into New Electronic Mail", Adversiting Age, Mar. 4, 1985, p. 74.

Damgard, "Payment Systems and Credential Mechanisms with Provable Security Against Abuse by Individuals", Advances in Cryptology—CRYPTO '88, 1988, pp. 328–335.

Davies et al., "Security for Computer Networks: An Introduction to Data Security in Teleprocessing and Electronic Funds Transfer", John Wiley & Sons, Dec. 5, 1985, pp. 304–336.

Dukach, S., "SNPP: A Simple Network Payment Protocol"; MIT Laboratory for Computer Science; Cambridge, MA, 7 pages.

Even et al., "Electronic Wallet"; Computer Science Department, Israel, pp. 383–386.

Ferrarini, E., "Direct Connections for Software Selections", Business Computer Systems, Feb. 1985, pp. 35–38.

Fujioka, et al., "ESIGN: An Efficient Digital Signature Implementation for Smart Cards," Advances in Cryptology—Eurocrypt '91, Apr. 1991, pp. 446–457.

Gifford et al., "Case Study: The Cirrus Banking Network"; Communications of the ACM, Aug. 1995, 2 pages.

Gifford, David K, "Notes on Community Information Systems", MIT/LCS/TM–419, Dec. 10, 1989, 7 pages.

Gifford, David K., "Cryptographic Sealing for Information Secrecy and Authentication", Stanford University and Xerox Palo Alto Research Center, Communications of the ACM, vol. 25, No. 4, Apr. 1982, pp. 274–286.

Hakola., et al., A System for Automatic Value Exchange Exchange, Proceedings—Fall Joint Computer Conference, Nov. 1966, pp. 579–589.

Harty et al., "Case Study: The VISA Transaction Processing System", May 1988, pp. 1–23.

Hirschfeld, "Making Electronic Refunds Safer", Laboratory for Computer Science, MIT, 1992, 4 pages.

Information Networking Institute, Carnegie Mellon University, Prototype Scope Document, INI Technical Report 1993–1, Oct. 14, 1993, 29 pages.

International Organization for Standardization, International Standard—Bank Card Originated Messages—Interchange Message Specifications Content for Financial Transactions, ISO 8583 1987.

Intuit Corp. Quicken User's Guide, "Paying Bills Electronically", no date, pp. 171–191.

Jansson, L., "General Electronic Payment System", $7^{th}$ Proceedings of the International Conference on Computer Communication, 1985, pp. 832–835.

Kenny, "EDI Security: Risks and Solutions", SD–Scion UK Limited, 1992, 12 pages.

Knapskog, "Privacy Protected Payments—Reliazation of a Protocol that Guarantees Payer Anonymity", EuroCrypt 1988, pp. 107–121.

Krajewski, M., "Concept for a Smart Card Kerberos", $15^{th}$ National Computer Security Conference, Oct. 1992, 9 pages.

Krajweski, M., et al., "Applicability of Smart Cards to Network User Authentication", Computing Systems, vol. 7, No. 1, Winter 1994, pp. 75–89.

Krajewski, M., "Smart Card Augmentation of Kerberos", Privacy and Security Research Group Workshop on Network and Distributed System Security, Feb. 1993, 5 pages.

Lai et al., "Endorsements, Licensing, and Insurance for Distributed System Services", Information Sciences Institute, U. of Southern California, undated, 6 pages.

Low et al., "Anonymous Credit Cards", undated, pp. 1–16.

Medvinsky et al., "Electronic Currency for the Internet", Electronic Markets., Sep. 1993, pp. 30–31.

Medvinsky et al., "NetCash: A Design for Practical Electronic Currency on the Internet", Information Sciences Intitute, University of S. California, under, 6 pages.

Messmer, "NIST Stumbles on Proposal for Public–Key Encryption", Network World, Jul. 27, 1992, pp. 1–6.

Mosaic Communications Corp. Press Release, "Mosaic Communications Unveils Network Navigator and Server Software for the Internet", Sep. 1994, 3 pages.

National Westminster Bank Broup, "Clearing House Automated Payments System", undated, 31 pages.

Needham, Roger M., "Adding Capability Access to Conventional File Servers", Xerox Palo Alto Research Center, California, undated, pp. 3–4.

Okamoto et al., "University Electronic Cash", NTT Laboratories, pp. 324–337.

Payment Systems, "United States", undated, pp. 217–235.

Perry, "Electronic Banking Goes to Market", IEEE Spectrum, Feb. 1988, pp. 46–49.

Pfitzmann et al., "How to Break and Repair a Provably Secure Untraceable Payment System", pp. 338–350.

Ph. van Heurck, "TRASEC: Belgian Security Systems for Electronic Funds Transfers," Computers & Security, 1987, pp 261–268.

Pongratz, et al., "IC Cards in Videotax Systems", Smart Card 2000, 1989, pp. 179–186.1 page.

Recommendation X.509; The Directory—Authentication Framework, Fascicle VIII.8 (Melbourne 1988) pp. 48–82.

Remery, P., et al., "Le paiement electronique", L'Echo des Recherches, No. 134, 1988, pp. 15–23.

Rescorla, E., et al., "The Secure HyperText Transfer Protocol", Enterprise Integration Techtologies, Jun. 1994, 22 pages.

Rescorla E., et al., "The Secure HyperText Transfer Protocol", Enterprise Integration Technologies, Dec. 1994, 35 pages.

Rivest et al., "A Method for Obtaining Digital Signatures and Public–Key Crypotosystems", Laboratory for Computer Science, MIT, undated, pp 1–15.

Schaumuller–Bichl, "IC Cards in High–Security Applications", Selected Papers from the Smart Card Conference, Springer Verlag, 1991, pp. 177–199.

Shain, "Security in Electronic Funds Transfer: Message Integrity in Money Transfer and Bond Settlements through GE Information Services' Global Network", Computers & Security, vol. 8, No. 3 1989, pp. 209–221.

Sirbu, Marvin A., "Internet Billing Service Design and Prototype Implementation", pp. 1–19.

Society for Worldwide Interbank Financial Telecommunications S.C.; "A S.W.I.F.T. Overview" no date, 34 pages.

Stallings, William, "Data and Computer Communications", MacMillan Publishing, 1985, pp. 245–252.

Staskauskas, "The Formal Specification and Design of a Distributed Electronic Funds–Transfer System", EEE, 1988, pp. 1515–1528.

Stol, "Privacy Protected Payments—A Possible Structure for a Real Implementation and Some Resource Considerations", Reproduced by U.S. Department of Commerce, 83 pages.

Strazewski, "Computerized Service Sets Shoppers Hacking", Advertising Age, Feb. 22, 1988, p. 62.

Takei, Videotex Information System and Credit System Connecting with MARS 301–of JNR, Japanese Railway Engineering, No. 95, Sep. 1985, pp. 9–11.

Tanaka et al., "Untraceable Electronic Funds Transfer Systems", Electronics and Communications in Japan, Part 3, vol. 72, No. 9, 1989, pp. 47–54.

Tenenbaum et al., "Development of Network Infrastructure and Services for Rapid Acquisition", Adapted from a White Paper Submitted to DARPA by MCC in Collaboratio with EIT and ISI, Jan. 1992, pp. 1–19.

Tunstall, "Electronic Currency", Smart Card 2000: The Future of IC Cards, Oct. 1987, pp. 47–48.

Vittal, "Active Message Processing: Messages as Messengers", 1981, pp. 175–195.

Viescas, John L., "The Official Guide to the Prodigy Service", Microsoft Press, 1991, ISBN 1–55615–374–0.

Waidner, et al., "Loss–Tolerance for Electronics Wallets", Fault–Tolerant Computing: $20^{th}$ International Symposium, Jun. 26–28, 1990, pp. 140–147.

Weber, "Controls in Electronic Funds Transfer Systems: A Survey and Synthesis", Computers & Security, 1989, pp. 123–137.

Williams, "Debit Program Cuts Fraud—CompuServe Plan a Success", Pensions & Investment Age, Feb. 4, 1985, pp. 31–33.

Joint Claim Construction Chart (Patent Local Rule 4–5D)), filed Dec. 27, 2004 with Appendix A.

Order Denying Amazon's Motion to Stay Proceedings Pending Completion of the Reexamination.

Transcript of the Markmam Hearing Before the Honorable Leonard David United States District Judge, Jan. 6, 2005.

"Advanced Electronic Credit Authorization Through the Amherst Group SNET", News Release, New Haven, CT, Dec. 7, 1987, 2 pages.

Anderson, Scot et al., "Sessioneer: Flexible Session Level Authenication With Off the Shelf Servers and Clients", igd.fhg.de/archive/1995_www95/papers/77/sessioneer2.html, pp. 1–7.

Buhle, E., Loren Jr., "Wide Area Information Servers", Digital Systems Journal, Sep./Oct. 1994, pp. 13–16.

Comer, D., et al., "The Tilde File Naming Scheme", The $6^{th}$ International Conference on Distributed Computing Systems, IEEE Computer Society, Cambridge, MA., May 1996, pp. 509–514.

Comer, D.E., et al., "A Model of Name Resolution in Distributed Systems", The $6^{th}$ International Conference on Distributed Computer Systems, IEEE Computer Society,, Cambridge, MA, May 1996, pp. 523–530.

Computer Fraud & Security Bulletin, "Underlying Security Mechansms", Mar. 1997, 2 pages.

Cookies and Privacy FAQ, search.netscape.com/assist/security/faqs/cookies.html Jan. 9, 1998 at 4:29 pm., pp. 1–3.

Crocker, Glenn, "web2mush: Serving Interactive Resources to the Web", $2^{nd}$ International Conference on the WorldWide Web, Chicago, Illinois, Oct. 1994, 7 pages.

Net Market Company, "Numerous News Media Stories", New York Times, Front Page of Business Section, Aug. 12, 1994, 4 pages.

Phillips, K., "SuperHighway Access Eases Internet Entry", PC Week, Oct. 31, 1994, 3 pages.

Poler, Ariel, "Improving WWW Marketing Through User Information and Non–Intrusive Communications", Internet Profiles Corporation (I/PRO), $2^{nd}$ WWW Conference, Chicago, Illinois, Oct. 1994, 4 pages.

Soverain's Disclosure of Asserted Claims and Preliminary Infringement Contentions dated Jun. 3, 2004.

Supplemental Disclosure of Preliminary Invalidity Contentions by Amazon and the Gap dated Jul. 26, 2004.
Deposition of G. Winfield Treese, dated Oct. 27, 2004.
Soverain's Reply to Amazon.Com's Amended Counterclaims, dated Jan. 14, 2005.
Third Supplemental to Defendant Amazon's Initial Disclosures, dated Mar. 4, 2005.
VIdeoTaped Deposition of Mark Levergood dated Mar. 8, 2005 (2 parts).
VideoTaped Deposition of Andrew Payne dated Mar. 11, 2005.
VideoTaped Deposition of Stephen Morris dated Mar. 9, 2005.
VideoTaped Deposition of Glenn Trewitt dated Jan. 25, 2005 (2 parts).
Soverain's Fourth Supplemental Responses to Amazon's First Set of Interrogatores (Nos. 1–14) dated Mar. 21, 2005.
Soverain's Responses to Interrogatory Nos. 22, 23, 26 and 36 of Amazon's Third Set of Interrogatores (Nos. 17–28) dated Mar. 21, 2005.
Soverain's Responses to Amazon's First Set of Requests for Admission to Plaintiff Soverain Software (Nos. 1–100) dated Mar. 21, 2005.
Memorandum Opinion dated Apr. 7, 2005.
Soverain's Reply to Amazon's Third Amended Counterclaims, dated Mar. 17, 2005.
Amazon.com's Renewed Motion to Stay Proceedings Until the Patent and Trademark Office Completes Re–Examination of the Three Patents in Suit, dated Apr. 5, 2005.
NCSA "What's New", archive.ncsa.uiuc.edu/SDG/Software/Mosaic/Docs/old–whats–new/whats–new–0294.html, Feb. 28, 1994, 17 pages.
Business Wire, CommerceNet Urges Government to Ease Export Restrictions on Encryption Products; Consortium's New White Paper Articulates Position on the Export of Cryptography–Based Products, Jun. 26, 1995, 2 pages.
Berners–Lee, T., et al., ietf.org/rfc/rfc1738.txt?numbers=1738.
Changes to wwwStat at ftp.ics.uci.edu/pub/websoft/www-stat/Changes.
Berners–Lee, T., RFC 1630: Universal Resource Identifiers in WWW: A Unifying Syntax for the Expression of Names and Addresses of Objects on the Network as used in the World–Wide Web.
Berners–Lee, T., et al. RFC 1738: Uniform Resource Locators.
Fielding, R., RFC 1808: Relative Uniform Resource Locators.
Berners–Lee, T., et al. RFC 1945: Hypertext Transfer Protocol—HTTP/1.0.
Fielding, R., et al. RFC 2068: Hypertext Transfer Protocol—HTTP/1.1.
Fielding, R., et al. RFC 2616: Hypertext Transfer Protocol—HTTP1/1.
Berners–Lee, T. "draft–ietf–iiir–http–00.txt" (Nov. 5, 1993).
wwwStat Readme file at ftp.ics.uci.edu/pub/websoft/www-stat/README.
NCSA HTTPd release notes at hoohoo.ncsa.uiuc.edu/docs/Upgrade.html (last updated Aug. 1, 1995).
Crocker, Glenn, "web2mush: Serving Interactive Resources to the Web," Electronic Proc. of the 2nd World Wide Web Conf. '94: Mosaic and the Web!, Developers Day, (Oct. 20, 1994).

Dukach, Seymon; Prototype Implementation of the SNPP Protocol; allspic.lcs.mit.edu; 1992.
Batelaan; Butler; Chan; Chen; Evenchick; Hughes; Jen; Jeng; Millett; Riccio; Skoudis; Starace; Stoddard; "An Internet Billing Server Prototype Design"; Carnegie Mellon.
O'Mahony, Donal, Michael Peirce, & Hitesh Tewari, Electronic Payment Systems, Artech House, Inc., pp. 145–155, Jan. 1997.
Maren, Michael, "The Age of E–Mail," Home Office Computing, vol. 11, No. 12, p. 63(5).
Foster, David & Stuart Finn, "Insurers Can Benefit From E–Mail Networks", National Underwriter Property & Casualty–Risk & Benefits Management, No. 9, p. 46(2), Mar. 4.
Ferrarini, E., "Flight of Fancy: Goodbye Travel Agent", Business Computer Systems, vol. 2, No. 11, pp. 39–40, Nov. 1993.
Trip et al., "Cookies" (client–side persistent information) and their use, Netscape Technical Note 20019, Netscape Communications Corp., Oct. 1995.
Archive of WWWorder mailing list (Jun. 18, 1994–Jun. 13, 1994).
Leggett, John et al., "Hyperform: Using Extensibility to Develop Dynamic, Open and Distributed Hypertext Systems" (1992).
Bieber, Michael, "Issues in Modeling of a 'Dynamic' Hypertext Interface for Non–Hypertext Systems" (1991).
Nielson, Jacob, *Hypertext & Hypermedia* (1990).
"Announcing: Internet Shopkeeper" (Aug. 2, 1994) posting on comp.infosystems.www and misc.forsale.
EAASY SABRE User's Guide and EAASY SABRE Reference Guide.
Compuserve Manual (undated).
The Major BBS: Collection of information and Advertisements concerning The Major BBS (Fall 1993).
Fielding, Roy, et al., "Principled Design of the Modern Web Architecture" *ACM Transactions on Internet Technology 2*, 2 pp. 115–150 (May 2002).
Smithson, Brian, and Singer, Barbara, An Information Clearinghouse Server for Industry Consortia, 2nd Int'l Conf. On the World Wide Web, Chicago, Ill., Oct. 1994.
Soverain's ANSWER to Counterclaim (Amazon's Third Amended Counterclaim) by Soverain Software LLC.(Seraphine, Jennifer) (Entered: Mar. 17, 2005).
NOTICE by Amazon.com re: Answer to Amended Complaint, Counterclaim Of Rejection Of Claims 1–45 Of U.S. Pat. No. 5,708,780 (Entered: Mar. 25, 2005).
MOTION to Stay [Renewed] by Amazon.com (Entered: Apr. 5, 2005).
Soverain's Opposition to Amazon's Renewed Motion to Stay.
Amazon.Com, Inc.'s Reply in Support of Renewed Motion to Stay.
Deposition of Glenn Arthur Hauman with Exhibits (Oct. 28, 2004).
Deposition of Glenn Crocker with Exhibits (Mar. 10, 2005).
Deposition of Glenn M. Trewitt with Exhibits (Jan. 25, 2005).
Deposition of Guy Henry Timothy Haskin with Exhbits (Mar. 18, 2005).
Deposition of Joshua Smith with Exhibits (Mar. 2, 2005).
Deposition of Kevin Ming–Wei Kadaja Hughes with Exhbits (Mar. 21, 2005).
Deposition of Michael Kuniavsky with Exhibits (Feb. 22, 2005).

Deposition of Michael Lazzaro with Exhibits (Mar. 9, 2005).

Deposition of Phillip Hallam–Baker with Exhibits (Mar. 11, 2005).

Deposition of Robert Allen Olson with Exhibits (Mar. 3, 2005).

Deposition of Thomas Soulanille with Exhibits (Mar. 14, 2005).

REPLY to Response to Motion re: MOTION to Stay [*Renewed*] (*Surreply in Opposition to Amazon's Renewed Motion to Stay*) filed by Soverain Software LLC.

Gifford, Stewart, Payne, Treese, "Payment Switches for Open Networks," presented at 40th IEEE, IEEE, COMPCON '95, Mar. 5–9, 1995, San Francisco, CA.

Defendant Amazon.com Inc.'s Unopposed Motion for Leave to Amend its Answer to Include Allegations Regarding Stuff.com.

Declaration of James E. Geringer in Support of Amazon.com, Inc's Motion for Leave to Amend its Answer and Counterclaims to Add Stuff.com.

Exhibit 1 of Geringer Declaration: Excerpts of Deposition of Michael Kuniavsky.

Exhibit 2 of Geringer Declaration: E–mail from Brooks Cutter to Mike Kuniavsky (Jun. 14, 1994).

Exhibit 3 of Geringer Declaration: Excerpts of Deposition of Richard Boake.

Exhibit 5 of Geringer Declaration: Excerpts of Deposition of Andrew Payne.

Exhibit 6 of Geringer Declaration: E–mail from Andrew Payne to Winfield Treese, et al. (Jun. 15, 1994).

Exhibit 7 of Geringer Declaration: Excerpts of Deposition of Winfield Treese.

Exhibit 8 of Geringer Declaration: Amazon.com, Inc.'s [Proposed] fourth Amended Answer, Affirmative Defenses, and Counterclaims to Soverain Software, LLC's Complaint (Redlined Version).

Amazon.com's Motion for Partial Summary Judgment that '314 claims 34–39, '492 claims 17–18 and 35–36, and '780 claims 1, 4, and 22–24 are invalid under 35 U.S.C. 102.

Amazon.com's Motion for Partial Summary Judgment that claims are indefinite under 35 U.S.C. 112.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–45 is confirmed.

New claims 46–136 are added and determined to be patentable.

46. *The method of claim 1, wherein the session identifier includes a key identifier.*

47. *The method of claim 1, wherein the session identifier includes an Internet Protocol address of the client.*

48. *The method of claim 1, further comprising the step of digitally signing the session identifier prior to returning it from the server to the client.*

49. *The method of claim 48, wherein the session identifier includes a plurality of information fields and is digitally signed by performing a hash computation on the information fields.*

50. *The method of claim 49, wherein the information fields of the session identifier include a user identification field and an expiration time field.*

51. *The method of claim 49, wherein the information fields of the session identifier include a network address field and a key identifier field.*

52. *The method of claim 49, wherein the information fields of the session identifier include a domain field and a network address field.*

53. *The method of claim 1, further comprising the steps of:*
   *determining that the service request is from an unauthorized user of the server; and*
   *prior to returning a session identifier to the unauthorized client,*
      *prompting the client to become an authorized user of the server by providing access credentials, the access credentials including a user identifier and a secret key; and*
      *validating the access credentials as the server; and*
   *transmitting a hypertext transfer protocol REDIRECT command back to the client along with the session identifier, wherein the REDIRECT command includes a uniform resource locator having the session identifier appended thereto.*

54. *The method of claim 53, further comprising:*
   *receiving the REDIRECT command at the client and processing the command using a web browser application operating at the client, the web browser application issuing a hypertext transfer protocol GET command in response to the REDIRECT command, the GET command including the uniform resource locator with the appended session identifier.*

55. *The method of claim 4, wherein the information recorded in the transaction log includes the network address of the client.*

56. *The method of claim 1, wherein the session identifier includes an access domain to which the client is authorized to gain access, the method further comprising the steps of:*
   *generating a relative uniform resource locator link at the client, the relative uniform resource locator link including the session identifier;*
   *transmitting the relative uniform resource locator link to the server;*
   *determining whether the relative uniform resource locator link is pointing to a hypertext page in the same access domain as that identified in the session identifier;*
   *if the relative uniform resource locator link is pointing to a hypertext page in the same access domain, then the server accepts the link and transmits the requested page to the client; and*
   *if the relative uniform resource locator link is pointing to a hypertext page in a different access domain, then the server denies the link.*

57. *The method of claim 56, further comprising the steps of:*
   *after denying the link, the server transmitting a hypertext transfer protocol REDIRECT command to the client, the REDIRECT command including a uniform resource locator of an authorization server.*

58. *The method of claim 1, further comprising the steps of:*
   *providing a browser program at the client; and*
   *storing one or more session identifiers at the browser program for use in transmitting subsequent service requests to the server.*

59. *The method of claim 1, wherein the uniform resource locator includes a transfer protocol identifier, a host name, one or more directory names, and a file name.*

60. *The method of claim 59, wherein the session identifier is appended to the path name in the uniform resource locator between the transfer protocol identifier and the file name.*

61. *The method of claim 1, wherein the server system tracks access history information within a client-server session.*

62. *The method of claim 61, wherein the access history information is used to charge for advertising on the server system.*

63. *The method of claim 62, wherein the amount to charge for advertising is based on a number of link traversals from an advertising page to a product page.*

64. *The method of claim 62, wherein the amount to charge for advertising is based on a count of purchases resulting from a path including an advertisement.*

65. *The method of claim 1, wherein the server system includes a content server and an authorization server, the content server receives the service request from the client and causes one or more client authentication parameters to be forwarded to the authorization server for authorization, the authorization server in turn returns the session identifier to the client.*

66. *The method of claim 65, wherein the request with the session identifier is transmitted from the client to the content server.*

67. *The method of claim 66, wherein the session identifier includes a plurality of information fields and a digital signature, and wherein the content server receives the request with the session identifier and compares the digital signature with a computed digital signature of the information fields in order to verify the session identifier.*

68. *The method of claim 65, wherein the authorization server queries a user account database and compares data* stored therein with the one or more client authentication parameters in order to authorize the client service request.

69. The method of claim 68, wherein the user account database includes a user identifier and a password.

70. The method of claim 68, wherein the user account database includes demographic information regarding the user of the client.

71. The method of claim 68, wherein the user account database includes a network address of the client.

72. The method of claim 71, wherein the network address is an Internet Protocol address.

73. The method of claim 65, further comprising the steps of:
   determining that the client is not authorized to access the content server; and
   the authorization server prompting the client to setup an account with the authorization server in order to become authorized to access the content server.

74. The method of claim 1, wherein the session identifier enables the client to access files within a protection domain.

75. The method of claim 74, wherein the protection domain includes a plurality of servers.

76. The method of claim 1, wherein the client is operating a web browser, and the server system is a web server, and wherein the session of requests include a plurality of hypertext transfer protocol GET requests transmitted from the client web browser to the web server, each of the GET requests including a uniform resource locator having the session identifier appended thereto.

77. The method of claim 65, wherein the content server transmits a hypertext transfer protocol REDIRECT command back to the client that causes the client to transmit the one or more client authentication parameters to the authorization server.

78. The method of claim 1, wherein the service request causes the server to transmit a document to the requesting client.

79. The method of claim 78, wherein the document is customized for the client by the server, prior to transmission, based upon the session identifier.

80. The method of claim 79, wherein the customized document is a web page, and the web page is customized based upon a user identifier encoded within the session identifier.

81. The method of claim 79, wherein the customized document is a web page, and the web page is customized based upon a user profile associated with the session identifier.

82. The method of claim 1, wherein the session identifier is provided to the client prior to or without a credential check procedure being performed between the client and the server.

83. The method of claim 82, wherein the credential check procedure includes a request for user name and password from the client.

84. The information system of claim 32, wherein the session identifier includes a user identifier.

85. The information system of claim 32, wherein the session identifier includes an expiration time for the session.

86. The information system of claim 36, further comprising means for tracking the access history to determine service requests leading to a purchase made within the session of requests.

87. The information system of claim 33, wherein the server system maintains a data base relating customer information to access patterns.

88. The information system of claim 87, wherein the information includes customer demographics.

89. The information system of claim 33, wherein the server system comprises plural servers including an authentication server which provides session identifiers for service requests to multiple servers.

90. The information system of claim 32, further comprising:
   means for directing the service request to a first server which is to provide the requested service;
   the first server including a means for checking the service request for a session identifier and for only servicing a service request having a valid session identifier, and where the service request has no valid identifier:
      the first server redirecting the service request from the client to the authorization server;
      the authorization server subjecting the client to the authorization routine and issuing the session identifier to be appended to the service request to the first server;
      the client forwarding the service request appended with the session identifier to the first server; and
      the first server recognizing the session identifier and servicing the service request to the client; and
   the client including a means for appending the session identifier to subsequent service requests to the server system.

91. The information system of claim 90, wherein the session identifier includes a user identifier.

92. The information system of claim 90, wherein the session identifier includes an expiration time for the session.

93. The information system of claim 90, wherein the session identifier provides access to a protected domain to which the session has access authorization.

94. The information system of claim 93, further comprising a means for modifying the session identifier for access to a different protected domain.

95. The information system of claim 90, wherein the session identifier provides a key identifier for key management.

96. The information system of claim 90, wherein the server system includes a means for recording information from the session identifier in a transaction log in the server system.

97. The information system of claim 90, wherein the client includes a means for modifying the path name of a current uniform resource locator using relative addressing and for retaining the session identifier portion of the path name unmodified for successive requests in the session.

98. The information system of claim 32, wherein:
   the server system subjects the client to an authorization routine prior to issuing the session identifier and the session identifier is protected from forgery, records information from the session identifier in a transaction log in the server system, tracks request paths relative to hypertext pages, and maintains a data base relating customer demographics to access patterns; and
   the client modifies the path name of a current uniform resource locator using relative addressing and retains the session identifier portion of the path name unmodified for successive requests in a session.

99. The information system of claim 32, wherein the session identifier includes a key identifier.

100. The information system of claim 32, wherein the session identifier includes an Internet Protocol address of the client.

101. The information system of claim 32, further comprising means for digitally signing the session identifier prior to appending it to the uniform resource locator.

102. The information system of claim 101, wherein the session identifier includes a plurality of information fields and is digitally signed by performing a hash computation on the information fields.

103. The information system of claim 102, wherein the information fields of the session identifier include a user identification field and an expiration time field.

104. The information system of claim 102, wherein the information fields of the session identifier include a network address field and a key identifier field.

105. The information system of claim 102, wherein the information fields of the session identifier include a domain field and a network address field.

106. The information system of claim 32, further comprising:
   means for determining that the service request is from an unauthorized user of the server; and
   means for prompting the client to become an authorized user of the server by providing access credentials, the access credentials including a user identifier and a secret key;
   means for validating the access credentials at the server; and
   means for transmitting a hypertext transfer protocol REDIRECT command back to the client along with the session identifier, wherein the REDIRECT command includes a uniform resource locator having the session identifier appended thereto.

107. The information system of claim 106, further comprising:
   means for receiving the REDIRECT command at the client and for processing the command using a web browser application operating at the client, the web browser application issuing a hypertext transfer porotocl GET command in response to the REDIRECT command, the GET command including the uniform resource locator with the appended session identifier.

108. The information system of claim 35, wherein the information recorded in the transaction log includes the network address of the client.

109. The information system of claim 33, wherein the session identifier includes an access domain to which the client is authorized to gain access, further comprising:
   means for generating a relative uniform resource locator link at the client, the relative uniform resource locator link including the session identifier;
   means for transmitting the relative uniform resource locator link to the server system;
   means for determining whether the relative uniform resource locator link is pointing to a hypertext page in the same access domain as that identified in the session identifier;
   means for accepting or denying the link, and if the link is accepted for transmitting the hypertext page pointed to by the link.

110. The information system of claim 109, further comprising:
   means, responsive to the link being denied, for transmitting a hypertext transfer protocol REDIRECT command to the client, the REDIRECT command including a uniform resource locator of an authorization server.

111. The information system of claim 32, further comprising:
   a browser program at the client; and
   means for storing one or more session identifiers at the browser program for use in transmitting subsequent service requests to the system.

112. The information system of claim 32, wherein the uniform resource locator includes a transfer protocol identifier, a host name, one or more directory names, and a file name.

113. The information system of claim 112, wherein the session identifier is appended to the path name in the uniform resource locator between the transfer protocol identifier and the file name.

114. The information system of claim 33, wherein the server system tracks access history information within a client-server session.

115. The information system of claim 114, wherein the access history information is used to charge for advertising on the server system.

116. The information system of claim 115, wherein the amount to charge for advertising is based on a number of link traversals from an advertising page to a product page.

117. The information system of claim 115, wherein the amount to charge for advertising is based on a count of purchases resulting from a path including an advertisement.

118. The information system of claim 33, wherein the server system includes a content server and an authorization server, the content server including means for receiving the service request from the client and for causing one or more client authentication parameters to be forward to the authorization server for authorization, the authorization server including means for returning the session identifier to the client.

119. The information system of claim 118, wherein the request with the session identifier is transmitted from the client to the content server.

120. The information system of claim 119, wherein the session identifier includes a plurality of information fields and a digital signature, and wherein the content server receives the request with the session identifier and compares the digital signature with a computed digital signature of the information fields in order to verify the session identifier.

121. The information system of claim 118, wherein the authorization server includes a means for querying a user account database and for comparing data stored therein with the one or more client authentication parameters in order to authorize the client service request.

122. The information system of claim 121, wherein the user account database includes a user identifier and a password.

123. The information system of claim 121, wherein the user account database includes demographic information regarding the user of the client.

124. The information system of claim 121, wherein the user account database includes a network address of the client.

125. The information system of claim 124, wherein the network address is an Internet Protocol address.

126. The information system of claim 118, further comprising:
   means for determining that the client is not authorized to access the content server; and
   the authorization server including means for prompting the client to setup an account with the authorization server in order to become authorized to access the content server.

127. The information system of claim 32, wherein the session identifier enables the client to access files within a protection domain.

128. The information system of claim 127, wherein the protection domain includes a plurality of servers.

129. The information system of claim 33, wherein the client is operating a web browser, and the server system is a web server, and wherein the session of requests include a plurality of hypertext transfer protocol GET requests transmitted from the client web browser to the web server, each of the GET requests including a uniform resource locator having the session identifier appended thereto.

130. The information system of claim 118, wherein the content server transmits a hypertext transfer protocol REDIRECT command back to the client that causes the client to transmit the one or more client authentication parameters to the authorization server.

131. The information system of claim 33, wherein the service request causes the server to transmit a document to the requesting client.

132. The information system of claim 131, wherein the document is customized for the client by the server, prior to transmission, based upon the session identifier.

133. The information system of claim 132, wherein the customized document is a web page, and the web page is customized based upon a user identifier encoded within the session identifier.

134. The information system of claim 132, wherein the customized document is a web page, and the web page is customized based upon a user profile associated with the session identifier.

135. The information system of claim 32, wherein the session identifier is provided to the client prior to or without a credential check procedure being performed between the client and the server.

136. The information system of claim 135, wherein the credential check procedure includes a request for user name and password from the client.

* * * * *